United States Patent [19]

Sanchez et al.

[11] 4,279,779

[45] Jul. 21, 1981

[54] SPHEROIDAL ALUMINA PARTICLES AND CATALYSTS EMPLOYING THE PARTICLES AS A SUPPORT

[75] Inventors: Moises G. Sanchez, Severna Park; Michael V. Ernest, Baltimore; Norman R. Laine, Rockville, all of Md.

[73] Assignee: W. R. Grace & Co., New York, N.Y.

[21] Appl. No.: 64,700

[22] Filed: Aug. 8, 1979

Related U.S. Application Data

[63] Continuation of Ser. No. 781,379, Mar. 25, 1977, Pat. No. 4,179,408.

[51] Int. Cl.³ .................. B01J 21/04; B01J 23/42; B01J 23/44; B01J 23/46
[52] U.S. Cl. .................................. 252/448; 252/463; 252/466 PT; 423/628
[58] Field of Search ............... 252/448, 463, 466 PT; 423/213.5, 628

[56] References Cited

U.S. PATENT DOCUMENTS

| | | | |
|---|---|---|---|
| 3,257,163 | 6/1966 | Stiles | 423/213.5 |
| 3,558,508 | 1/1971 | Keith et al. | 252/463 X |
| 3,615,207 | 10/1971 | Lee | 252/466 PT |
| 3,635,841 | 1/1972 | Keith et al. | 252/466 PT |
| 3,850,849 | 11/1974 | Kiovsky et al. | 252/463 |
| 3,856,708 | 12/1974 | Carithers | 252/463 |
| 3,960,772 | 6/1976 | Fort et al. | 252/455 R |
| 3,979,334 | 9/1976 | Lee et al. | 252/448 |
| 4,003,851 | 1/1977 | Ebel et al. | 252/465 |
| 4,051,073 | 9/1977 | Hegedus et al. | 252/466 PT |
| 4,154,812 | 5/1979 | Sanchez et al. | 423/626 |

*Primary Examiner*—W. J. Shine
*Attorney, Agent, or Firm*—Mark T. Collins

[57] ABSTRACT

Spheroidal alumina particles have a combination of high macroporosity, surface area, crush strength and low attrition loss and bulk density. The particles are prepared by an improved external gelation oil-drop process. In the process a slurry of alumina, preferably a microcrystalline boehmite-pseudoboehmite intermediate, is prepared in an acidic aqueous medium and droplets of the slurry are passed through air into a column containing an upper body of water-immiscible liquid and ammonia and a lower body of aqueous coagulating agent. Catalysts employing the particles as a support and having catalytic agents distributed at controlled depths in the particle have excellent initial and sustained activity and durability, especially for eliminating pollutants in automotive exhaust streams.

23 Claims, No Drawings

SPHEROIDAL ALUMINA PARTICLES AND CATALYSTS EMPLOYING THE PARTICLES AS A SUPPORT

This is a continuation, of application Ser. No. 781,379, filed Mar. 25, 1977 now U.S. Pat. No. 4,179,408.

This invention relates to an alumina composition, a catalyst support comprising spheroidal alumina particles that may be prepared from the alumina composition, and a catalyst employing the alumina particles as a support. The invention also relates to processes for preparing alumina and spheroidal alumina particles. The low density and high surface area, macroporosity, mechanical strength, and stability of the alumina support provide a catalyst of excellent activity and durability, especially for converting atmospheric pollutants in automotive exhaust gases to less objectionable materials.

Catalysts often comprise a major portion of macrosize particles formed from porous solid support material and a minor portion of one or more catalytic materials carried by the support. The macrosize particles are generally about 1/32 to ½ inch in width or diameter and about 1/32 to 1 inch or more in length, commonly about 1/16 to ½ inch in length.

The activity, efficiency, stability, and durability of a catalyst in a reaction depend upon the chemical, physical, and structural properties of the catalyst precursors, i.e., the support material and the formed support particles, and the nature and distribution of the catalytic material on the formed support. Minor variations in these properties may produce substantial differences in the performance of the catalyst. Desirably, the properties of the support material that enhance catalytic activity are retained by the formed support particles. In general, the formed support and catalyst comprising small amounts of the catalytic material on the support have essentially the same physical and structural properties with slight differences due to the effects of the thermal activation of the catalyst.

The internal porous structure of the catalyst particles and their precursors determines the extent and accessibility of surface area available for contact of the catalytic materials and the reactants. Increased pore size results in greater diffusion rates for reactants and products in and out of the catalyst particles and this often results in improved catalyst activity. However, the extent to which pore size can be advantageously increased is limited. As the pore size is increased, there is a decrease in the surface area where the reactions take place. A good catalyst should have a balanced combination of high specific surface area, cumulative pore volume, and macroporosity. High macroporosity means a pore size distribution with a relatively high proportion of pores having a diameter greater than 1000Å. Further, alumina and formed alumina with a low density and consequent low thermal inertia will produce a catalyst that will reach reaction temperatures sooner.

Catalyst support material is frequently a porous refractory inorganic oxide, such as silica, alumina, magnesia, zirconia, titania, and combinations thereof. Alumina is a particularly desirable support material since it inherently has a high degree of porosity and will maintain a comparatively high surface area over the temperature range normally encountered in many catalytic reactions. However, when used under high temperature conditions for long periods of time, overheating of the alumina may cause sintering and change in the crystalline phase of the alumina which reduce catalytic activity, for example, due to loss of surface area available for catalysis. Alumina is used as a catalyst support in the form of a finely divided powder or of macrosize particles formed from a powder.

Since the physical and chemical properties of alumina are highly dependent on the procedures followed in its preparation, many preparation processes have been developed in attempts to optimize its properties for use as a catalyst support material. Alumina is frequently precipitated by combining a water-soluble, acidic aluminum compound which may be an aluminum salt such as aluminum sulfate, aluminum nitrate, or aluminum chloride, and an alkali metal aluminate such as sodium or potassium aluminate. However, the properties of the resultant compositions after washing and drying have generally been deficient in one or more of the properties of high surface area, macroporosity, phase stability, and low density.

U.S. Pat. No. 2,988,520 to Braithwaite discloses a process for making alumina of high surface area, good pore volume, and satisfactory density and attrition characteristics by adding aluminum sulfate to an aqueous alkaline aluminate solution. The precipitation pH is maintained constant between 8 and 12 and the reactant concentrations are controlled. The process of U.S. Pat. No. 3,864,461 to Miller et al. produces low bulk density alumina consisting essentially of pseudoboehmite by controlling the reaction temperature, the concentrations of the reactant solutions of sodium aluminate and aluminum sulfate, the rate of introduction of the aluminate into the sulfate solution so that a substantial proportion of the alumina precipitates under acidic conditions, and the length of time of alkaline aging.

As described in U.S. Pat. No. 3,520,654 to Carr et al., alumina of high surface area, high porosity, and low density may be prepared by reducing the pH of a soluble aluminum salt solution to 4.5 to 7, and drying and washing the alumina product. The patent notes that, although low density alumina is softer and more subject to attrition than high density alumina, it shows great advantage as a catalyst support. High density, finely divided alumina with increased attrition resistance for use as a catalyst support may be prepared by precipitation from alkali metal aluminate and aluminum sulfate at a pH of 8.5 to 10, and/or aging at a pH between 10 and 11 in accordance with the processes of U.S. Pat. 3,032,514 and U.S. Pat. 3,124,418 to Malley et al.

In addition to retaining the surface area, porosity, and density characteristics of the starting alumina material, a process for the formation of macrosize alumina particles should produce formed alumina with low shrinkage and high attrition resistance and crush strength. Conventional low density supports are generally deficient in structural integrity. Unless stabilized, an alumina particle will undergo considerable shrinkage of its geometric volume when exposed to high temperatures during use. Excessive shrinkage produces unoccupied channels in the catalyst bed through which reactants pass without contact with the catalyst.

High attrition resistance provides structural integrity and retention of activity under conditions of mechanical stress. During transfer, loading into the reaction zone, and prolonged use, the catalyst particles are subjected to many collisions which result in loss of material from the outer layers. Attrition of the catalytically active layer present in the outer volume of the particles affects catalytic performance and also results in a decrease of the volume of the material in the reaction zone. Volume loss by shrinkage and/or attrition of the highly compacted, tightly held particles in a fixed catalyst bed tends to loosen them and allow for increased motion and collisions during vibration. Once a packed bed becomes loose, attrition tends to increase. During storage, the catalyst is often packed in large tall containers awaiting loading. In order to withstand the forces generated by the weight of the particles above them, the catalyst must exhibit high crush strength.

The size, size distribution, and shape of the particles affect both structural integrity and catalytic activity. These properties determine the volume of catalyst that can be packed in a fixed bed, the pressure drop across the bed, and the outer surface area available for contact with the reactants. Finely divided alumina may be pelletized, tabletized, molded or extruded into macrosize particles of the desired size and shape. Typically, the macrosize particles are cylinders of diameter about 1/32 to $\frac{1}{4}$ inch and a length to diameter ratio of about 1:1 to 3:1. Other shapes include spheroidal, polylobal, figure-eight, clover leaf, dumbbell and the like.

Spheroids offer numerous advantages as a catalyst support over particles having angular shaped surfaces with salients or irregularities, such as extruded cylinders. Spheroidally shaped particles permit a more uniform packing of the catalyst bed, thereby reducing variations in the pressure drop through the bed and in turn reducing channelling which would result in a portion of the bed being bypassed. Another advantage in using particles of this shape is that the spheroids exhibit no sharp edges which will attrit during processing, transfer, or use.

One of the most described methods for producing spheroidal alumina particles is the oil-drop method in which drops of an aqueous acidic alumina material gel to spheroids in falling through a water-immiscible liquid and coagulate under basic pH conditions. A wide variety of oil-drop techniques have been developed in attempts to provide structural and mechanical properties that would enhance the activity and durability of alumina-supported catalysts. The density, surface area, porosity and uniformity of the spheroidal product vary greatly with the nature of the alumina feed and, along with crush strength and attrition resistance, are dependent on the conditions used in the preparation of the feed and the coagulation and gelation steps, as well as subsequent drying and calcination steps. Internal gelation, i.e. gelation of the alumina by a weak base, such as hexamethylenetetramine, that is added to the feed before drop formation and that releases ammonia in the heated immiscible liquid, is the most common oil-drop method.

U.S. Pat. No. 3,558,508 to Keith et al. describes an oil-drop method employing an external gelation technique in which gaseous ammonia is introduced into the bottom of a column containing the water-immisicible liquid and coagulates the droplets by contacting their external surfaces. The Keith et al. process is based to a considerable extent on the use of specific alumina feed prepared by acidic hydrolysis of finely divided aluminum. Spherical alumina particles may also be formed by the hydrocarbon/ammonia process described in Olechowska et al., "Preparation of Spherically Shaped Alumina Oxide", *International Chemical Engineering*, Volume 14, No. 1, pages 90–93, January, 1974. In this process, droplets of a slurry of nitric acid and dehydrated aluminum hydroxide fall through air into a column containing hydrocarbon and ammonia phases. The droplets assume spheroidal shapes in passing through the water-immiscible liquid and then are coagulated to firm spheroidal beads or pellets in the coagulating medium. Similar processes utilizing pseudosol feeds and hydrochloric acid are described in:

1. Katsbashvili et al., "Formation of Spherical Alumina and Aluminum Oxide Catalysts by the Hydrocarbon-Ammonia Process—1. The Role of Electrolytes in the Formation Process", *Kolloidnyi Zhurnal*, Vol. 28, No. 1, pp. 46–50, January-February, 1966;
2. Katsobashvili et al, "Preparation of Mechanically Strong Alumina and Aluminum Oxide Catalysts in the Form of Spherical Granules by the Hydrocarbon-Ammonia Forming Method", *Zhurnal Prikladnoi Khimii*, Vol. 39, No. 11, pp. 2424–2429, November, 1966; and
3. Katsobashvili et al., "Formation of Spherical Alumina and Aluminum Oxide Catalysts by the Hydrocarbon-Ammonia Process—Coagulational Structure Formation During the Forming Process", *Kolloidnyi Zhurnal*, Vol. 29, No. 4, pp. 503–508, July-August, 1967.

Catalysts are used to convert pollutants in automotive exhaust gases to less objectionable materials. Noble metals may be used as the principal catalytic components or may be present in small amounts to promote the activity of base metal systems. U.S. Pat. Nos. 3,189,563 to Hauel and 3,932,309 to Graham et al. show the use of noble metal catalysts for the control of automotive exhaust emissions. U.S. Pat. No. 3,455,843 to Briggs et al. is typical of a base metal catalyst system promoted with noble metal. Unpromoted base metal catalysts have been described in U.S. Pat. No. 3,322,491 by Barrett et al.

The activity and durability of an automotive exhaust catalyst is in part dependent on the location and distribution of noble metals on the support. Since the use of noble metal is controlled to a great extent by cost, small amounts of noble metals should be placed on the support in a manner that achieves the best overall performance over the life of the catalyst.

Several competing phenomena are involved in the surface treatment. Impregnating the maximum amount of the support particle provides the greatest amount of impregnated surface area. However, since gas velocities are high and contact times are short in an automotive exhaust system, the rate of oxidation of carbon monoxide and hydrocarbons and the reduction of nitrogen oxides are diffusion controlled. Thus, the depth of impregnation should not exceed the distance that reactants can effectively diffuse into the pore structure of the particle. A balance of impregnated surface area coupled with proper dispersion and accessibility should be achieved to formulate a practical catalyst.

Catalytic metal accessibility and dispersion will provide initial high catalytic activity, once the catalyst reaches operating temperature. However, since significantly high amounts of hydrocarbons, carbon monoxide, and other partially combusted materials are produced in exhaust gases during the initial moments of the engine start, the catalyst should have low thermal inertia in order to operate efficiently when the reaction zone is at a relatively low temperature.

A common deficiency of exhaust catalysts is decreased activity when exposed to high temperatures, mechanical vibration and poisons present in the exhaust such as lead, phosphorus, sulfur compounds, etc., for long periods of use of up to 50,000 miles or so. An effective catalyst will retain its activity through resistance to noble metal crystallite growth, poisons, crystalline phase changes, and physical degradation.

An optimum high temperature alumina catalyst support has low density and high macroporosity while retaining substantial surface area and crush strength and attrition resistance. Furthermore, it is stable in crystalline phases and geometric volume occupied. Difficulties have been encountered in achieving the proper balance of these interrelated and sometimes competing properties and in combining an alumina support and metal impregnation techniques to provide a catalytic converter capable of decreasing automotive exhaust emissions to the levels required by present and future government standards.

According to the present invention, an alumina composition having properties uniquely suitable for the formation of spheroidal particles is prepared by a process in which the alumina ia precipitated under specific and controlled reactant concentrations and reaction temperature, time, and pH and aged at a higher pH subsequent to filtration. In the process, a sufficient amount of an aqueous solution of aluminum sulfate having an $Al_2O_3$ concentration of about 5 to about 9 weight percent and a temperature of about 130° to about 160° F. is added to water at a temperature of about 140° to about 170° F. to adjust the pH of the mixture of 2 to 5. An aqueous solution of sodium aluminate having an $Al_2O_3$ concentration of about 18 to about 22 weight percent and a temperature of about 130° to about 160° F. and a further amount of aqueous aluminum sulfate solution are simultaneously added to the mixture to precipitate alumina and form an alumina slurry. The pH and temperature of the slurry are maintained during the precipitation from about 7 to about 8 and from about 140° to about 180° F. respectively, and a rate of addition of the solutions is maintained to form intermediate boehmite—pseudoboehmite alumina. The pH of the slurry is then adjusted to about 9.5 to about 10.5. The slurry is then filtered and the filter cake washed to provide a substantially pure alumina. The process is reproducible and prepares a hydrous alumina from which process impurities can be easily removed by water washing and filtration. The control of temperature, time, rates, concentrations and pH produces an alumina which is a substantially pure, microcrystalline pseudoboehmite-boehmite intermediate having from about 70 to about 85 weight percent of the total amount of $Al_2O_3$ present in crystalline form.

Substantially uniform spheroidal alumina particles aving an unexpected combination of low density and high surface area, macroporosity, phase stability, and mechanical strength are prepared, preferably from the wet or dried boehmite-pseudoboehmite intermediate, by the improved external gelation process of this invention. A slurry of alumina is prepared in an acidic aqueous medium and droplets of the slurry are passed through air into a column containing an upper body of a waterimmiscible liquid and ammonia and a lower body of aqueous alkaline coagulating agent. The resulting spheroidal particles are aged in aqueous ammonia to the desired hardness. The aged particles are dried and calcined.

It has also been discovered that a catalyst comprising a catalytically active metal or metal compound impregnated on the spheroidal alumina particles has excellent activity and durability in many catalytic systems. It is especially suited for eliminating pollutants in automotive exhaust streams because of its quick light off and sustained activity under high temperatures and mechanical vibrations present in exhaust systems.

The process for preparing alumina of this invention comprises five main phases. Phase I involves the formation of boehmite crystal seeds at acidic pH's in very dilute aqueous systems and is referred to as the nucleation phase.

Phase II, which is the main phase, involves the precipitation and crystallization of alumina at a pH from about 7 to about 8. During this phase, crystallites of boehmite or pseudoboehmite grow from the hydrous precipitated alumina onto the crystalline seeds. Phase II is called the precipitation and crystallite growth phase.

Phase III involves changing the pH of the system by the addition of an alkaline solution in order to reduce the electrical surface charge on the alumina precipitate. During this phase, the positive charge of the alumina particles is gradually reduced until at pH 9.4–9.6, it becomes essentially zero. In this condition, the alumina precipitate is said to exist at its isoelectric point. That is the point in pH at which the surface does not exhibit any electrical charge. Phase III is, therefore, called the surface electrical charge reduction phase.

Optional Phase IV involves the aging of the system for predetermined periods of time, and phase V involves the filtering and washing of the resulting slurry in order to remove undesirable electrolytes or impurities.

An optional final step of the process is the drying of the washed filter cake to a powdery material. This may be done with or without the incorporation of specific additives in order to reduce the absorption of impurities.

The reactants used to carry out the process of this invention are water soluble aluminum salts, such as aluminum sulfate, aluminum nitrate, aluminum chloride, and the like; and an alkalimetal aluminate, such as sodium aluminate, potassium aluminate, and the like. In specific embodiments, the preferred reactants are aluminum sulfate and sodium aluminate for reasons of cost, availability, and desirable properties in carrying out the invention. The reactants are used in the form of aqueous solutions. The aluminum sulfate may be used over a wide range of concentrations above about 5 weight percent; however, for practical reasons, it is used preferably in high concentrations from about 6 to about 8 wt.% equivalent $Al_2O_3$.

The sodium aluminate solution should be a relatively freshly prepared solution exhibiting no precipitated or undissolved alumina. The sodium aluminate may be characterized by its purity and equivalent alumina concentration, which should be in excess of about 16 weight percent, preferably about 18 to 22 weight percent equivalent $Al_2O_3$. Furthermore, it should contain enough alkali, such as equivalent $Na_2O$, to assure complete dissolution of the alumina. The sodium aluminate should exhibit an $Na_2O$ to $Al_2O_3$ mole ratio in excess of about 1.2, preferably in excess of about 1.35. Of course, for economic and practical reasons, the upper limit of the mole ratio should not be too great so that in practical commercial processes, the ratio will not exceed about 1.5. Impurities, insufficient levels of soda, and high dilutions, will make the sodium aluminate unstable.

Before the start of the process, the reactant solutions are heated to a temperature of about 130° to about 160° F., preferably to about 140° F. The reaction starts with the nucleation phase in which an initial charge or heel of deionized water is placed in a suitable reactor tank. The water is agitated and heated to a temperature from about 140° F. to about 170° F. In general, the temperature of the heel is anywhere from about 5° to about 10° F. below the target temperature at which the reaction is to be run.

An initial charge of aluminum sulfate is added to the water in a very small amount sufficient to adjust the pH of the mixture to a value between about 2 and about 5, preferably between about 3 and about 4. At this point, the concentration of equivalent alumina in the mixture should not exceed about 0.1 weight percent, preferably about 0.05 weight percent. The combination of very low concentration, low pH, and high temperature results in the partial hydrolysis of the aluminum sulfate with the concomitant formation of extremly small crystallites of boehmite. This nucleation process takes place rapidly and the beginning of phase II may start soon after the first addition of aluminum sulfate. However, it is preferred to wait up to about 10 minutes, preferably about 5 minutes, in order to insure that the nucleation phase has run its course and the system has been properly seeded.

The second phase in the process is carried out by simultaneously adding the sodium aluminate and aluminum sulfate reactants to the mixture that comprises the water heel containing the crystalline seeds. These solutions are added simultaneously from separate streams into the reactor at preset and essentially constant rates to precipitate the alumina and form an alumina slurry. However, since the reaction is to be carried out at a pH between about 7 and about 8, the rate of addition of one of the reactants may be slightly adjusted during the run to insure that the desired pH range of the slurry is reached rapidly.

During this phase, the pH will rapidly climb from about 2 to about 5 to about 7 to about 8. As the reactants are added to the initial heel, the alumina concentration in the resulting slurry will gradually increase. Under the conditions specified, the precipitate of alumina will tend to crystallize into an intermediate boehmite-pseudoboehmite crystalline alumina. If the rate of precipitation exceeds the rate of crystallization for the particular conditions used, the excess hydrous alumina will remain in the precipitate as alumina gel. The alumina prepared in the present invention exhibits a balance between the amount of crystalline boehmite-pseudoboehmite intermediate and the amount of gel. This requires that the rate of precipitation as dependent on the rate of addition of the reactants, exceeds by a controlled amount the rate of crystallization of the hydrous alumina into the boehmite-pseudoboehmite intermediate. The pH and temperature of the slurry and the rates of addition of the reactants are maintained during the precipitation to form crystalline boehmite-pseudoboehmite intermediate. Since the rate of crystallization is principally set by the temperature of the system, the rates of addition of the reactants will vary depending on the particular temperature at which the reaction is carried out. On the low temperature side of the operable temperature range, the rate of crystallization will be relatively slow and, consequently, the addition of the reactants should proceed at a slow rate. Generally, the temperature is maintained from about 140° to about 180° F. For example, for temperatures in the range of about 140° to about 150° F., the rate of addition should make phase II last in excess of 60 minutes, preferably in excess of 70 minutes.

On the other hand, on the upper side of the operable temperature range, such as about 170° to about 180° F., the rate of addition can be markedly increased so as to carry out phase II in shorter times, such as about 15 to about 30 minutes. In the preferred precipitation reaction, the temperature will be between about 150° and about 170° F. and the rate of precipitation should be controlled so as to carry the reaction over a period of about 30 minutes to about 70 minutes, preferably from about 40 minutes to about 60 minutes.

In a very specific embodiment, the reaction should be carried out at 155° to 165° F. with the addition of the reactants carried over a period of about 48 to about 52 minutes by maintaining the flow of reactants essentially constant over the entire precipitation phase and adjusting the relative flows, if necessary, to provide a programmed pH as follows:

| Time in Minutes From Start of Phase II | pH Range Of Slurry |
|---|---|
| 5 ± 2 | 7.0–7.4 |
| 10 ± 2 | 7.2–7.5 |
| 20 ± 2 | 7.3–7.5 |
| 50 ± 2 | 7.35–7.45 |

In general, the exothermic nature of the reaction will provide sufficient heat to maintain the temperature at the desired level provided the water heel and reactants are preheated as prescribed. In the event that difficulty is experienced in maintaining a desired temperature, external cooling or heating may be provided to insure appropriate temperature control. Carrying out the precipitation reaction under the prescribed conditions will insure the formation of a precipitated alumina exhibiting the desired balance between crystalline alpha alumina monohydrate (boehmite-pseudoboehmite intermediate) and gel.

At the end of phase II, the concentration of equivalent $Al_2O_3$ in the slurry should range from about 5 to about 9 weight percent, preferably from about 6 to about 8 weight percent. Material balance of the reactants added to this point may be carried out which will indicate that the ratio of sodium expressed as moles of $Na_2O$ to sulfate ion expressed as moles of equivalent $H_2SO_4$ will be in excess of 0.80, preferably in excess of 0.88, but below 0.97.

At the conclusion of phase II, when the desired quantity of alumina has been precipitated, the flow of aluminum sulfate is stopped. Phase III is then conducted in order to reduce the electrical charge on the surface of the precipitated alumina from a strong positive level to zero or possibly to a low negative value. This is done by adjusting the pH from the value at the end of phase II of about 7 to about 8 to a value near or slightly in excess of the isoelectric point for alumina, which is somewhere between 9.4 and 9.6. Generally, the pH of the slurry is adjusted to about 9.5 to about 10.5, preferably about 9.6 to about 10.0.

The pH change may be done through the use of any strong alkaline solution, such as sodium hydroxide. However, from a practical point of view, it is desirable to continue using as the alkaline solution the initial sodium aluminate reactant solution. By doing so, while the pH change takes place, an additional amount of alumina will be incorporated into the slurry to increase yields and reduce costs. Consequently, in a preferred embodiment of the present invention, phase III is carried out by the continued addition of sodium aluminate at reduced rates. This insures that the pH target is not exceeded or that localized over-concentrations of the sodium aluminate will not cause the precipitation of alumina under high pH conditions favoring the formation of undesirable crystalline phases, such as bayerite (beta alumina trihydrate). During phase III, the temperature of the slurry is maintained and the agitation is continued as during phases I and II. The sodium aluminate is added at a slow rate first continuously until the pH is raised to about 9.5 to about 10.0 and then discontinuously, if necessary to reach the final pH target. During this phase, the sulfate ion which is fixed onto the surface of the alumina particles is freed as the positive charge of the alumina surface is reduced to zero or made somewhat negative. When a pH from 9.5 to 10.5 is obtained, preferably a pH of about 9.6 to about 10.0, the flow of sodium aluminate is discontinued and phase III may range from as low as 4 minutes to as long as 20 minutes, preferably it should be carried out over a period of time from about 6 to about 12 minutes.

In phase IV, after all the reactants have been added, the slurry may be aged up to several hours depending on practical considerations such as the readiness of the equipment used in the next steps of filtration and washing. In general, aging for about 30 minutes is used. In any event, since a large batch of alumina slurry prepared through phase III may not be filtered in a single batch, but may be done continuously over a period of time, some of the material will, of necessity, be aged while waiting for the filtration step.

The alumina slurry is then filtered and the filter cake washed to eliminate undesirable impurities. Preferably, deionized water is used as the washing liquid to remove water-soluble impurities. The use of water containing impurities, for example, calcium, magnesium, chloride, carbonate or bicarbonate, is undesirable. However, depending on the ultimate use of the alumina, some of these impurities such as the volatile impurities may be tolerated. However, metal impurities such as calcium, magnesium, iron, silicon, nickel, etc., cannot be tolerated except in extremely small concentrations.

The term "substantially pure" as used in this specification and claims refers to alumina having levels of impurities expressed on a dry basis that do not exceed the following limits: Sodium expressed as $Na_2O$, 0.15 weight percent; calcium expressed as CaO, 0.15 weight percent; magnesium expressed as MgO, 0.15 weight percent; silicon expressed as $SiO_2$, 0.80 weight percent; iron expressed as $Fe_2O_3$, 0.07 weight percent; nickel expressed as NiO, 0.07 weight percent.

The use of deionized water will result in a pure alumina product. The deionized water is usually heated in order to facilitate the removal of electrolytes and may have a temperature of 120° to about 180° F. The removal of electrolytes during washing is facilitated by the crystalline nature of the precipitate. Crystalline materials exhibit a lower tendency to occlude impurities and are easier to wash because of improved filtration characteristics. The amount of deionized water required to achieve good quality in the product may vary depending on the particular filtration equipment used. However, it will normally range from about 20 lbs. to 100 lbs. of water per pound of $Al_2O_3$ (dry basis) in the filter cake.

In certain specific embodiments, the washed filter cake can be used to prepare a satisfactory feed for the preparation of alumina spheroids as described in greater detail hereinafter. This can be done by removing as much water as possible during the filtration step and using the de-watered filter cake together with specific additives for the preparation of the feed.

In a preferred embodiment, the filter cake is dried to produce a powder of alumina which can be conveniently stored without degrading for long periods of time prior to use in further processing. The drying of the filter cake may be done by several methods, such as tray drying, belt drying, and the like. However, the preferred methods involve the addition of water to the filter cake in order to form a pumpable slurry and the quick removal of water by such methods as spray drying or flash drying. In these cases, the pumpable alumina slurry contains about 15 to about 20 weight percent solids. The slurry is delivered through a nozzle into the drying chamber as finely divided droplets. The droplets come into contact with hot drying gases. For example, in the spray dryer the inlet temperature of the drying gases ranges from about 800° to about 700° F. The rate of addition of slurry is adjusted so as to obtain an exit temperature of greater than about 250° F., but not to exceed about 400° F., preferably between about 300° and about 350° F. The use of these conditions insures the partial removal of wateer without destroying the crystalline nature of the alumina.

In the case where the drying gases are the combustion products of the fuel used, these gases contain substantial concentrations of carbon dioxide. Carbon dioxide upon coming in contact with the alkaline slurry will be absorbed and possibly chemically reacted on the surface. In such cases, the end product will contain a small amount of carbon dioxide as an impurity. This carbon dioxide is not of major concern in most of the steps which follow. However, if conditions so demand, it is possible to reduce the pick-up of carbon dioxide by previously acidifying the pumpable slurry with a trace amount of an acid to a pH of about 7 or lower. Preferred acids in this step are thermally decomposable organic acids, such as acetic and formic acid. Mineral acids may become fixed impurities which will affect the process at a later stage; or, in the case of nitric acid, be a source of undesirable pollutants.

During spray drying, a portion of the gel content of the precipitate may crystallize to the boehmite-pseudoboehmite intermediate depending on specific conditions used. The spray dried product is not completely dry but contains a certain proportion of water. In general, the spray dried product will contain at least about 18 weight percent water and may range upwards to about 33 weight percent water. Preferably, the range of water content will be between about 20 and about 28 weight percent.

Alumina as used herein refers to an alumina material containing $Al_2O_3$, water of hydration, associated water, and the like. The degree of drying of the alumina may be expressed in terms of the weight percent of $Al_2O_3$ therein. Drying at 1200° C. for 3 hours is considered to produce 100% $Al_2O_3$.

The partially dried, hydrous alumina produced by the controlled reaction of sodium aluminate and aluminum sulfate is an intermediate between boehmite and pseudoboehmite. This form of alumina is alpha alumina monohydrate with extra water molecules occluded within the crystal structure and has the formula $Al_2O_3 \cdot xH_2O$ where x is a value greater than 1 and less than 2. The boehmite-pseudoboehmite nature of the product, including its crystalline structure, the degree of crystallinity and average size of the individual crystallites, may be determined by X-ray diffraction techniques.

Pseudoboehmite is discussed by Papee, Tertian and Biais in their paper: "Recherches sur la Constitution des Gels et des Hydrates Cristallises d' Alumine", published in the Bulletin de la Societe Chimique de France 1958, pp. 1301–1310.

Boehmite is a well-defined mineral known for many years whose crystalline nature and X-ray diffraction pattern are given in ASTM card No. 5-0190.

Other properties which characterize the product of our invention are: its behavior during aging under alkaline conditions; its ability to chemisorb anions such as sulfates at various pH's; its crystalline nature and stability after severe thermal treatments; and the high temperature stability of its surface area, pore volume, and pore size distribution.

All of the above properties stem from the unique balance of crystalline and amorphous gel components in the product combined with its excellent overall chemical purity.

The X-ray diffraction technique employed to determine the degree of crystallinity is as follows: the X-ray diffraction pattern of the product under study is determined using any of the several X-ray diffraction units commercially available, such as a Norelco X-ray diffractometer. A pattern is obtained which gives the location and intensity of the diffraction peaks. This pattern is compared with the data given in ASTM card No. 5-0190 on boehmite. A matching of all of the diffraction peaks indicates that the product is boehmite. However, if the [020] peak is shifted to 6.6–6.7 Å while the other peaks remain essentially unchanged this indicates the presence of pseudoboehmite. The nature of a product can be further defined by determining the exact position of the [020] d-spacing. Intermediate values of 6.2 to 6.5 Å indicate the presence of materials of intermediate nature. The [020] peak can further be used to determine the degree of crystallinity of the material. The area under this diffraction peak is measured with a planimeter and compared with the area under the corresponding peak of a reference sample run under identical conditions in the X-ray diffractometer. The reference sample is selected from a product known to have a high proportion of boehmite and defined as "100% boehmite". The ratio of the areas provides a relative measure of the degree of crystallinity of the sample under study.

Finally, the nature of the crystallinity can be further detailed by measuring the width of the [020] diffraction peak. Mathematical relationships have been derived by others and published in the literature which allow the calculation of the average crystallite size in Å as a function of the peak width measured half way of the maximum peak intensity.

For a particular diffraction peak, the average crystallite size is inversely related to the width of the peak at half its maximum intensity. Relative measurements can be made by simply measuring the width at half the maximum intensity of the [020] diffraction peak. Large values of the width correspond to small crystallite sizes while small values of the width correspond to large crystallite size. For example, a 100% crystalline alpha alumina monohydrate obtained by the dehydration of well-defined large crystals of alpha alumina trihydrate gives very tall and narrow diffraction peaks. In this material, the [020] reflection occurs at 6.1 Å indicating that the product is boehmite as opposed to pseudoboehmite, and the width at half maximum intensity is only about 0.2 Å indicating the presence of large crystallites.

In contrast, microcrystalline pseudoboehmite exhibits the [020] peak at values ranging from 6.6 to 6.7 Å. These materials show much wider peaks with values at half maximum intensity of about 2 Å or greater. In other words, these materials exhibit a crystallite size approximately one order of magnitude greater than the 100% crystalline alpha alumina monohydrate.

The product of our invention exhibits an intermediate boehmite-pseudoboehmite structure characterized by a [020] d-spacing which ranges from about 6.2 to about 6.5 Å, preferably from about 6.3 to about 6.4 Å. The half maximum intensity width of the [020] peak ranges from about 1.65 to about 1.85 Å, preferably from about 1.75 to about 1.80 Å.

In terms of relative crystallinity, our product exhibits values from about 70 to about 85 weight percent of the total amount of $Al_2O_3$ present in crystalline form. The boehmite-pseudoboehmite product of our invention is characterized by high crystalline purity, by small crystallite size—i.e., microcrystallinity and by a high relative degree of crystallinity. In these respects, the product is unique by virtue of the fact that it is prepared under conditions which give a high ratio of crystalline material to amorphous gel. This is in contrast with materials of the prior art in which the fraction of amorphous gel in the product is either quite high or essentially non-existent such as in boehmite. The intermediate nature of the crystallinity in our material makes it unique in its application as a starting powder for the preparation of catalytic supports of excellent and unexpected properties.

The nature of the balance between crystalline and amorphous materials in our product may be further characterized by the following tests:

The conversion of gel components to undesirable crystalline phases, such as bayerite, and Anion surface chemisorption at different pH's.

Amorphous hydrous aluminas have a tendency to crystallize. The particular crystalline phase which is obtained depends on the nature of the environment around the alumina during crystallization. A material consisting of boehmite or pseudoboehmite and containing high proportions of gel components will crystallize to beta trihydrate (bayerite) if exposed to elevated temperatures for long periods of time in an alkaline aqueous environment. In contrast, materials containing little or no gel components will not develop the bayerite crystalline phase under similar conditions of alkaline aging. For example, an alumina prepared at low temperatures and consisting principally of pseudoboehmite interdispersed with a high proportion of gel will, upon aging at least for about 18 hours at about 120° F. in a sodium hydroxide aqueous solution of a high pH such as 10, develop bayerite while otherwise remaining essentially unchanged in its crystalline nature. This indicates that the formation of the bayerite is not at the expense or disappearance of pseudoboehmite but that it is formed from the amorphous alumina gel. In contrast, the product of our invention treated under the same conditions will not exhibit the presence of any bayerite. This indicates that the amount of gel in our material is quite small or otherwise more stable.

The anion chemisorption tests involve the preparation of a slurry of the alumina powder to be studied with deionized water, and the potentiometric titration of this slurry with dilute sulfuric acid of known normality over a pH range in which alumina is insoluble. The titration is carried out slowly to make sure that there is ample time for the acid to diffuse into the structure of the alumina product. Over the pH ranges in question from about 9 to about 4 alumina is insoluble, so the titration with sulfuric acid is regarded as a measure of the amount of sulfate which becomes fixed or chemisorbed on the surface of the alumina at a given pH. For different aluminas, the amount of acid required to reach a particular pH from a common starting point, is an indirect measure of the extent of the alumina interface surface exposed to the aqueous medium. Materials which exhibit a very high degree of crystallinity and very large crystallite size possess a small interface surface area and consequently, require small amounts of acid to effect a given change in pH. In contrast, materials which are very high in gel content exhibit high interface surfaces areas and, consequently, require large amounts of acid to effect the same pH change. Products of intermediate crystalline/gel nature will require intermediate amounts of acid to effect the same pH change.

For example, 100% crystalline alpha alumina monohydrate which consists of very well-defined large crystallites required only about 53 milliequivalents of sulfuric acid per mole of alumina to change the pH from an initial value of about 8.3 to a final value of about 4.0. In contrast, an alumina prepared at low temperatures in which the pseudoboehmite nature, percent crystallinity and crystallite size indicate a low degree of crystallinity and a high gel content, requires about 219 milliequivalents of sulfuric acid per mole of alumina to effect the same change in pH.

The composition of our invention is characterized by intermediate requirements of sulfuric acid to effect the pH change. From about 130 to about 180 milliequivalents of sulfuric acid per mole of alumina, preferably from about 140 to about 160 milliequivalents, will change the pH of a slurry of our composition from about 8.3 to about 4.0.

The application of the alumina powder product of our invention in making suitable supports for automotive exhaust catalysts requires that the material exhibit good stability of its structural properties at elevated temperature. For example, its pore volume and surface area, determined after severe thermal treatments simulating those which a catalyst encounters during use, should remain high and stable. These high temperatures properties are highly dependent on the purity of the initial material and its structural features as well as the crystalline nature of the product after thermal treatments.

Our material will upon heating lose gradually its water of hydration and other associated or bound water. This dehydration will cause a transition of the crystalline structure to gamma alumina. Further heating to higher temperatures will cause the gamma alumina to convert to delta and eventually to theta alumina. All of these aluminas are transition aluminas of high surface area and pore volume. Heating to still higher temperatures will cause the formation of alpha alumina or corundum which is not a transition alumina and exhibits a very low surface area and pore volume. The final transition to alpha alumina is so profound that its formation is accompanied by dramatic decreases in pore volume and surface area. A good alumina powder capable of conversion to good automotive exhaust catalyst supports should be thermally stable and not exhibit the transition to alpha alumina at moderately high temperatures, such as 1800°–1900° F. In general, aluminas with high gel content will have a tendency to sinter to alpha alumina at relatively moderate temperatures, such as 1800°–1900° F. Materials which have been prepared at low temperatures and which exhibit high gel content as measured by several of the tests given in this specification, will show the appearance of undesirable alpha alumina when heated, for example, to 1850° F., for one hour.

In contrast, the product of our invention, which contains only a small amount of amorphous gel, will remain stable and will not show any alpha alumina under identical thermal treatment. Our composition has an X-diffraction pattern of theta alumina, gamma alumina, and delta alumina after heating at about 1850° F. for about one hour. Furthermore, the product of our invention will retain at those temperatures very substantial surface areas and pore volumes which will remain stable even for prolonged periods of time under severe thermal treatments.

Our product after a thermal treatment of about 1 hour to about 1850° F., will exhibit a BET nitrogen surface area of about 100 to about 150 square meters per gram, more commonly to about 110 to about 140 square meters per gram. It will also exhibit a nitrogen pore volume from about 0.60 to about 0.75 cm.$^3$/g., most commonly from about 0.64 to about 0.72 cm.$^3$/g.

Furthermore, the pore structure of this thermally treated material will not exhibit a high proportion of microporosity as determined by nitrogen pore size distribution methods. Typically, our product will not exhibit any nitrogen pore volume below about 80 Å size, more commonly below 100 Å.

Throughout this specification and claims, the "nitrogen pore volume" refers to the pore volume as measured by the techniques described in the article by S. Brunauer, P. Emmett, and E. Teller, *J. Am. Chem. Soc.*, Vol. 60, p. 309 (1938). This method depends on the condensation of nitrogen into the pores, and is effective for measuring pores with pore diameters in the range of 10 to 600 Å.

The surface areas referred to throughout this specification and claims are the nitrogen BET surface areas determined by the method also described in the Brunauer, Emmett, and Teller article. The volume of nitrogen adsorbed is related to the surface area per unit weight of the support.

Dried alumina powders or washed alumina filter cake with the proper crystalline character as prepared by this invention are preferably used in preparing the feed for the oil-drop forming process. However, other suitable starting alumina compositions as described hereinafter may also be used to form spheroidal alumina particles in our improved process. The alumina and an acidic aqueous medium, such as an aqueous solution of an acid or acid salt, are commingled to provide a slurry. Preferably, an aqueous solution of a monobasic mineral acid is commingled with water and the alumina to provide the slurry. Use of a monobasic acid provides a homogeneous, plastic slurry with the desired viscosity. Hydrochloric acid and other strong monobasic acids may be used and the support washed free of these electrolytes.

Aluminum nitrate may be used. Nitric acid is preferred because it is decomposed and removed from the spheroids by heating later in the process so that washing the spheres is not necessary. In order to minimize the nitrogen oxides produced in the later states as noxious emissions, a decomposable monobasic organic acid such as acetic acid, (hereinafter represented symbolically as $CH_3COOH$), formic acid, or mixures thereof, preferably replaces a major portion of the nitric acid. For example, a mixture of organic acid and nitric acid in a molar ratio of about 0.5 to 5 may be employed.

Bulk density and crush strength of the spheroid product depend upon feed composition. Increasing alumina and/or acid content of the feed increases these physical properties. Too high a concentration of alumina and/or acid may result in spheroid fracture upon drying and too low a concentration in weak, powdery spheroids. Because of the gel content of the alumina powder used in preparing the feed, a minor amount of acid is sufficient to form a plastic slurry. The slurry may contain about 1 to about 12 weight percent of a monobasic acid or mixtures thereof and the slurry generally contains about 10 to about 40, preferably about 24 to about 32 weight percent of alumina and has a molar ratio of acid to alumina of about 0.05 to about 0.50. The quantity of water is sufficient to yield a slurry with these acid and alumina contents. Normalizing the system in relation to one mole of alumina, the inorganic acid molar ratio may vary between 0.5 to 0.03, preferably 0.06, and the organic acid molar ratio from 0 to 0.3, preferably 0.12, and the water molar ratio may be about 5 to about 50, preferably about 10 to about 20. An especially preferred slurry has a molar composition of

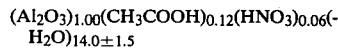

The slurry may be prepared from a single alumina composition or a blend of alumina compositions. Blends are used to take advantage of some specific properties of the individual components of the blend. For example, alumina filter cake may be acidified with acetic acid, to about pH 6.0, prior to spray drying to reduce carbon dioxide absorption. A high carbonate content in the powders may result in sphere cracking during drying. Thus, 20 parts of this low carbonate alumina may be combined with 80 parts of untreated dried powder to give a blend with an acceptable carbonate level. Preferably, the alumina powder and acidic aqueous medium are commingled in stages by adding portions of the powder to the medium to acidify the alumina and reduce the level of $CO_2$ that may be present in the spray dried alumina powder. For example, 80 percent of the alumina required for a given batch of product may be mixed in water which contains the desired quantities of acid. After a period of mixing, the remaining 20 percent of the powder is then added to the batch. In addition, recycled, calcined product fines in an amount of up to about 15 percent of total alumina may be added. This decreases the tendency of the product to shrink to about 2 to about 3 volume percent. It also makes the process more economical in that scrap product such as fines, etc., can be recycled.

Agitation and aging of the slurry provide a uniform material with a viscosity that permits proper formation of the droplets from which the spheroids with low shrinkage can be made. Agitation of the slurry can be accomplished by a variety of means ranging from simple hand stirring to mechanical high shear mixing.

Slurry aging can range from a few minutes to many days. The aging time is inversely related to the energy input during mixing. Thus, the alumina powder can be stirred, by hand, into the acid and water mix for 10 minutes and aged overnight to reach the proper consistency for droplet formation. For example, in a specific preferred method using about 10 lbs. of powder, 60 percent of the powder is mixed with all of the acid and water and blended vigorously with a ½ H. P. Cowles dissolver turning a 3 inch blade at about 3500 RPM. for about 2 to about 30 minutes or preferably about 15 to about 20 minutes. The remaining 40 percent of the powder is then added and stirring recommenced for about 5 to about 60 minutes and preferably about 30 to about 40 minutes. After agitation, the slurry is aged for about 1 to about 5 hours to reach the proper consistency. During mixing, the pH rises and a final pH of generally about 4.0 to about 4.8, preferably about 4.3 to about 4.4, is achieved. The viscosity of the slurry, measured immediately after the preferred blending technique, may vary between about 60 and about 300 centipoises (cps). For optimum droplet formation, slurry viscosities of about 200 to about 1600 cps, preferably about 800 to about 1200 cps are desirable. Viscosities as high as 2000 cps may be used but the slurries are difficult to pump.

Under actual operating conditions in a plant, there might be occasions in which a slurry may have to wait for long periods of time prior to further processing. Under these conditions, the viscosity of the system may climb above the pumpable range. Such a thickened slurry need not be wasted. It still can be used by following any of the following two procedures:

The thick slurry may be diluted with controlled amounts of water and strongly agitated for short periods of time. This will result in a sharp decrease of the viscosity and will bring the system into the pumpable range.

The thick slurry may be mixed with a freshly prepared slurry which will exhibit a low viscosity between about 60 and about 300 cps. The resulting mixture will have a viscosity in the pumpable range and can be used in the process.

Both of these remedial steps can be practiced without adversely affecting the properties of the finished product nor the subsequent processing steps.

The viscosity of slurries referred to in these specifications, examples and claims, is the viscosity as measured with a Brookfield viscometer.

The spheroidal particles are formed by gelation in an organic phase and an aqueous phase. Droplets of the aged slurry are formed in air above a column which contains an upper body of water-immiscible liquid and ammonia and a lower body of an aqueous alkaline coagulating agent. The drops assume spheroidal shapes in passing through the upper phase and then are coagulated into firm spheroidal particles in the lower phase. The ammonia in the upper phase gels the droplet exterior layers sufficiently to allow the spheroidal shape to be retained as the droplets cross the liquid interface and enter the lower phase. Excessive interfacial tension between the phases may result in retention of the droplets in the organic phase and possibly their deformation. In such cases, a small quantity of surfactant, for example, about 0.05 to about 0.5, preferably 0.1 to about 0.2 volume percent of the upper body, is placed at the interface and permits the spheres to penetrate it easily. Liquinox ®, a detergent sold by Alconox, Inc., New York, N.Y., and other such surfactants may be employed.

The water-immiscible liquid will have a specific gravity lower than water, preferably lower than about 0.95, and can be, for example, any of the mineral oils or their mixtures. The organic liquid should not permit the droplets to fall too rapidly which may inhibit proper sphere formation. Furthermore, it should not exhibit high interface surface tension which may hold up and deform the particles. Examples of suitable mineral oils, include kerosene, toluene, heavy naptha, light gas oil, paraffin oil, and other lubricating oils, coal tar oils, and the like. Kerosene is preferred because it is inexpensive, commercially available, non-toxic and has a relatively high flash point.

The organic liquid should be capable of dissolving small amounts of anhydrous gaseous ammonia or be capable of forming suspensions containing trace amounts of water which contain dissolved ammonia. An essential requirement of the process is that the organic phase contain sufficient, but small, amounts of a base, preferably ammonia, in order to be able to effect the partial neutralization and gelation of the outer layers of the falling droplets. The rate of introduction of ammonia into the organic liquid should be sufficient to reach an operating concentration in which firm particles will be formed in the short time span of fall. However, the ammonia concentration should not be so high as to cause essentially instantaneous gelation of the slurry droplets as they enter the organic liquid. Under these conditions, the droplets will gel into misformed particles since they have not had sufficient time of fall to allow their surface tension to spheroidize the droplet. Furthermore, high concentrations of ammonia in the upper regions of the organic liquid will cause evaporation of gaseous ammonia into the air pocket where the nozzles are located. Excessive ammonia concentration in this region may cause premature gelation of the droplets prior to the point of separation from the nozzle. This is very undesirable because premature gelation in the nozzle will cause plugging and malfunction of the delivery system. Ammonia is a preferred coagulation agent because it produces good spheroids, exhibits a convenient solubility, and may be conveniently introduced into the lower portion of the organic liquid. In a preferred embodiment, the organic liquid is contacted with anhydrous gaseous ammonia in a separate apparatus called the ammoniator, and circulated through the column. In such an event, the organic liquid from the ammoniator is introduced in the lower portion of the organic phase in the column and it flows upwardly through the column establishing a counter current flow with the falling droplets. The organic liquid is removed at the top of the column and returned to the ammoniator for replenishing with added ammonia.

Under steady state conditions, an ammonia concentration gradient develops within the organic phase of the column. The gradient is caused by the reaction of the falling acidic alumina slurry droplets with the ascending ammonia carried by the organic phase. Because of the lower ammonia concentration in the upper portions of the column, the droplets have time to shape into spheroids before they gradually gel as they descend. The ammonia concentration in the organic liquid may be determined by titration with hydrochloric acid to a bromthymol blue endpoint and may be maintained between about 0.01 to about 1.0, preferably about 0.04 to about 0.07, weight percent. Lower concentrations generally result in flattened spheroids, and higher concentrations in deformations such as tail formation.

The length of the column can vary widely and will usually be from about 3 to 20 feet in height. The organic phase may generally comprise about ⅓ to about ⅔ of the column length and the coagulation phase the remainder.

The aqueous medium may contain any substance capable of inducing gelation and having an appropriate specific gravity, i.e. lower than the specific gravity of the slurry droplets. This permits the spheres to pass through it. Alkaline aqueous solutions such as sodium hydroxide, sodium carbonate, or ammonia can be used as the coagulating medium. The preferred medium is an aqueous solution of ammonia, because it and its neutralization products are easily removed from the spheroids in later processing steps. Washing is not necessary to remove the ammonium residue as it would be to remove a sodium residue. The ammonia concentration in the aqueous phase may be about 0.5 to 28.4 weight percent preferably about 1.0 to about 4.0 weight percent. During prolonged use, ammonium nitrate and acetate may be formed and build up to steady state levels in the aqueous phase. These are products of the neutralization reaction occurring during sphere gelation. Their steady state concentration will be dependent upon the concentrations of the acids in the alumina slurry feed. In the development of this invention ammonium acetate and ammonium nitrate were added to the aqueous ammonia phase to simulate the effects of eventual steady state values of these salts. For the preferred slurry composition, the concentrations used were typically about 1.3 and about 0.8 weight percent respectively.

Under continuous operation, ammonia must also be constantly added to the aqueous phase to replace that used in gelation of the spheres. In a preferred embodiment of this invention, the aqueous phase is circulated between the column and an ammoniator tank. This tank also serves as a reservoir with a batch collection system to take up aqueous ammonia solution displaced from the column as spheres fill up the collection vessel. The aqueous phase is removed from the column to maintain a constant interface level. In a continuous sphere take-off system, the reservoir feature of the aqueous phase ammoniator would not be needed. Either type of collection system can be used.

The cross sectional area of the column is dependent upon the number of droplet nozzles used. For one nozzle, a one inch diameter column provides approximately 5 cm.² of cross-sectional area, which is sufficient to keep the uncoagulated droplets from hitting the column walls and smearing and sticking on the walls. A four inch diameter column provides enough cross-sectional area for up to about 16 to 20 nozzles to permit the droplets to fall independently through the column without contacting each other or the walls.

In one embodiment of a suitable column, the aged slurry is pumped into a pressurized multiple orifice feed distributor that is located at the top of the oil column and contains a multiplicity of nozzles positioned about ½ inch above the organic liquid. The pressure of the feed distributor is dependent upon the slurry viscosity. Pressures of about 0.1 to about 15 p.s.i.g. are normally used. The feed distributor pressure regulates the droplet formation rate. The latter varies from about 10 to about 250 droplets per minute with a preferred rate being about 140 to about 180 drops per minute. A distributor pressure of about 1.5 to about 2.5 p.s.i.g. gives the desired droplet rate when the slurry viscosity is in the range of about 800 to about 1200 cps. The nozzles employed can vary in diameter to give spheroidal particles of the desired size. For example, a 0.11 inch internal diameter nozzle will produce spheroids of a diameter of about ⅛ inch. Preferably, an air flow is provided around the nozzles to keep ammonia vapor from prematurely gelling the droplets. The droplets of slurry are formed in air at the nozzle tips and fall through air into the body of water-immiscible liquid. When the drops of slurry initially contact the immiscible liquid, they are usually lens-shaped. As the drops fall through ammonia-treated organic liquid, they gradually become spheroidal particles which are set into this shape by the coagulating ammonia and harden further in the lower aqueous ammonia phase.

The particles are then aged in aqueous ammonia with a concentration of about 0.5 to 28.4 weight percent, preferably the same concentration as in the column. The particles develop additional hardness so that they are not deformed during subsequent transfer and processing steps. In general, the particles may be aged from about 30 minutes to about 48 hours, preferably about 1 to 3 hours.

The particles are then drained and dried. Forced draft drying to about 210° to about 400° F. for about 2 to 4 hours may be advantageously employed although other drying methods may also be used. In a preferred drying method, the drying is done in a period of under 3 hours by programming the temperature to climb gradually and uniformly to about 300° F. The amount of air used may normally vary between about 400 and 600 standard cubic feet per pound of $Al_2O_3$ contained in the wet spheroids. Under certain circumstances, some of the air may be recirculated in order to control the humidity of the drying medium. The spheres are usually spread over a retaining perforated surface or screen or thicknesses ranging from 1 to 6 inches preferably 2 to 4 inches. A slight shrinkage usually occurs during drying but the spheroids retain their shape and integrity.

Deviations from the prescribed conditions of preparation of starting raw materials may often result in significant changes in the products obtained. Excessive powder particle size, crystallinity, or level of impurities may result in cracking and fracturing during drying. On the other hand excessive levels of gel in the powder, or pseudo-boehmite may result in excessive shrinkage and densification upon drying which can also lead to cracking. Alumina compositions other than the product of our invention which are suitable for spheroid formation will generally have a boehmite or pseudoboehmite crystalline structure, preferably microcrystalline, a nitrogen pore volume of 0.4 to 0.6 cm.$^3$/g., surface areas in excess of 50 m.$^2$/g. and will contain amorphous gel.

The dried spheroid product is then treated at high temperatures to convert the crystalline alumina hydrate and amorphous gel components to a transition alumina. This may be done by batch or continuous calcination by contacting the product with hot gases which may be either indirectly heated gases or the combustion products or ordinary fuels with air. Regardless of the particular method used, the product is calcined at specific temperature ranges depending on the particular transition alumina desired.

For example, to obtain a GAMMA type alumina, the product may be conveniently calcined at temperatures of about 1000° F. to about 1500° F. For applications which require high temperature stability while retaining high surface area and porosity, the target material may be theta alumina. A predominantly theta alumina product may be obtained by calcination at about 1750° to about 1950° F. preferably about 1800° to about 1900° F. for periods of from about 30 minutes to about 3 hours, preferably from about 1 hour to about 2 hours. For automotive exhaust catalysts, the high temperature treatment step is often called stabilization.

The catalyst support that comprises the spheroidal alumina particles and that is obtained after stabilization has the following range of properties:

| Property | Approximate General Range |
| --- | --- |
| Surface Area (m.$^2$/g.) | 80–135 |
| Compacted Bulk Density (lbs./ft.$^3$) | 20–36 |
| Total Pore Volume (cm.$^3$/g.) | 0.8–1.7 |
| Pore Size Distribution (cm.$^3$/g.) | |
| Below 100 A | 0–0.06 |
| 100–1000 A | 0.5–1.0 |
| 1000–10,000 A | 0.1–0.4 |
| Above 10,000 A | 0–0.4 |
| Crush Strength (lbs.-Force) | 5–15 |
| Volume Shrinkage (%) | 0–6 |
| Attrition Loss (%) | 0–5 |
| Mesh Size | −4 + 10 |

However, when the preferred starting raw materials are used under the preferred conditions of preparation, the property ranges become:

| Property | Typical Range |
| --- | --- |
| Surface Area (m.$^2$/g.) | 90–120 |
| Compacted Bulk Density (lbs./ft.$^3$) | 26–32 |
| Total Pore Volume (cm.$^3$/g.) | 0.9–1.2 |
| Pore Size Distribution (cm.$^3$/g.) | |
| Below 100 A | 0–0.04 |
| 100–1000 A | 0.6–0.9 |
| 1000–10,000 A | 0.2–0.3 |
| Above 10,000 A | 0–0.3 |
| Crush Strength (lbs.-force) | 7–12 |
| Volume Shrinkage (%) | 2–4 |
| Attrition Loss (%) | 0–2 |
| Mesh Size | −5 + 7 |

The catalyst support may have a crush strength of at least about 5 pounds or greater than about 7 pounds, a volume shrinkage of less than about 6% or less than about 4%, and an attrition loss of less than about 5% or less than about 2%.

The surface areas are nitrogen BET surface areas and the other above specified properties were determined by the following methods. These methods may be also applied to the finished catalysts.

Compacted Bulk Density

A given weight of activated spheroids is placed in a graduated cylinder sufficient to contain same within its graduated volume. "Activated" as used herein means treated at 320° F. in a forced draft oven for 16 hours prior to the testing. This activation insures that all materials are tested under the same conditions. The cylinder is then vibrated until all settling ceases and a constant volume is obtained. The weight of sample occupying a unit volume is then calculated.

Total Specific Pore Volume

A given weight of activated spheroids is placed in a small container (for example, a vial). Using a micropipette filled with water, the said sample is titrated with water until all of the pores are filled and the endpoint of titration occurs at incipient wetness of the surface. These measurements are consistent with total porosities calculated from the equation:

$$P = \frac{f}{D} - \frac{1}{\rho}$$

in which:
P = total specific porosity (cm.$^3$/g.)
f = volume packing fraction (for spheroids typically 0.64±0.04)
D = compacted bulk density (g./cm.$^3$)
$\rho$ = crystal density of skeleton alumina (g./cm.$^3$) (typically between 3.0 and 3.3 g./cm.$^3$ for transition aluminas)

Mercury Pore Size Distribution

The pore size distribution within the activated spheroidal particle is determined by mercury porosimetry. The mercury intrusion technique is based on the principle that the smaller a given pore the greater will be the mercury pressure required to force mercury into that pore. Thus, if an evacuated sample is exposed to mercury and pressure is applied incrementally with the reading of the mercury volume disappearance at each increment, the pore size distribution can be determined. The relationship between the pressure and the smallest pore through which mercury will pass at the pressure is given by the equation:

$$r = \frac{-2\sigma \cos\theta}{P}$$

where
r = the pore radius
$\Sigma$ = surface tension
$\theta$ = contact angle
P = pressure Using pressures up to 60,000 p.s.i.g. and a contact angle of 140°, the range of pore diameters encompassed is 35–10,000 Å.

Average Crush Strength

Crush strength is determined by placing the spheroidal particle between two parallel plates of a testing machine such as the Pfizer Hardness Tester Model TM141-33, manufactured by Charles Pfizer and Co., Inc., 630 Flushing Avenue, Brooklyn, New York. The plates are slowly brought together by hand pressure. The amount of force required to crush the particle is registered on a dial which has been calibrated in pounds force. A sufficient number (for example, 50) of particles is crushed in order to get a statistically significant estimate for the total population. The average is calculated from the individual results.

Shrinkage

A given amount of particles is placed in a graduated cylinder and vibrated until no further settling occurs, as is done in determining Compacted Bulk Density. This sample is then placed in a muffle furnace at 1800° F. for 24 hours. At the end of this exposure, its volume is again measured after vibration until no further settling occurs. The loss in volume after heating is calculated, based on the original volume, and reported as percent shrinkage.

Attrition Loss

A set volume (60 cc.) of material to be tested is placed in an inverted Erlenmeyer flask of special construction which is connected to a metal orifice inlet. A large (one inch) outlet covered with 14-mesh screening is located on the flat side (bottom) of the flask. High velocity dry nitrogen gas is passed through the inlet orifice causing the particles to: (1) circulate over one another thus causing attrition, and (2) impact themselves in the top section of the flask thus breaking down as a function of strength. The material is tested for five minutes and the remaining particles are weighed. The loss in weight after testing expressed as percent of the initial charge is designated the attrition loss.

The nitrogen flow will be in the range of about 3.5 and 4.0 cubic feet per minute, depending upon the density of the material. The flow rate must be sufficient for the particles to strike the top section of the flask. The fines produced by attrition are carried out of the flask by the nitrogen flow thus causing a loss in weight of the original material charged.

The alumina and sphere formation conditions of the present invention provide spheroidal alumina particles with a highly unexpected and uniquely desirable combination of properties. The spheroids have a total pore volume ranging from about 0.8 to about 1.7 cm.$^3$/g. While this is a high total pore volume, in itself it is not exceptional. What makes this pore volume exceptional is the size distribution of the pores which make up this volume and high temperature stability of this volume. A large fraction of the volume is made up of macropores (>1000 Å). Most of the rest of the pores are in the 100–1000 Å range. There are very few micropores (<100 Å). This type of distribution is important for catalytic activity and stability. In a heterogeneous process, catalytic activity is highly dependent upon the rate of diffusion of reactants to the catalyst sites and of reaction products away from the sites. Thus, reaction processes in a catalyst containing a large amount of macroporosity are less diffusion dependent. However, the macropores account for only a small fraction of the sample surface area. The intermediate size pores provide the surface area required for catalytic activity. This surface area has two components; namely, that required by the catalytically active clusters themselves and that required to keep the clusters separated. If the clusters are allowed to fuse together, their catalytic surface area and consequently the catalyst activity will decrease. Microporosity of course, provides a very large surface area, but, this does not necessarily provide good catalytic activity. Diffusion of reactants and/or products may be the rate controlling factor. Micropores can be closed over by sintering occurring during catalyst operation or by deposition of poisons such as lead compounds in an auto exhaust system. In either case, the activity of the catalyst in the closed micropores would be lost.

The surface area of the product spheroids is high, but is not unusually high. Surface areas range from about 350 m.$^2$/g. to about 500 m.$^2$/g. for spheroids heated to 1000° F. and drop to about 80 m.$^2$/g. to about 135 m.$^2$/g. for thermally stabilized spheroids at 1800°–1900° F. What is important, however, is that most of the surface area is associated with intermediate size pores and not with micropores.

This preferred porosity distribution and its pore volume stability are a direct result of the unique combination of properties in the alumina powder used to make the spheroids. In particular, its purity and high ratio of crystalline material to amorphous gel aid in minimizing microporosity.

These properties also help to account for the high temperature stability of the spheroids. The spheroids exhibit low volume shrinkage, preferably less than about 4%. They retain the transition alumina structure. Alpha alumina is not detected even at temperatures of 1950° F. It is well known that impurities act as sintering aids. Thus, high impurity levels can promote shrinkage and alpha alumina formation. A high gel content also leads to alpha alumina formation at high temperatures. A high microporosity can result in high volume shrinkage as micropores are closed off during sintering.

The spheroids also have an uncommon combination of low bulk density and relatively high crush strength. Low bulk density is essential for quick light off, i.e. high initial catalytic activity. The crystallinity of the alumina compositions is a contributing factor to both the low bulk density and high crush strength.

The low attrition loss exhibited by the spheroids is a direct consequence of their shape and strong structure. The smooth surface will not attrit as readily as irregular surfaces which exhibit corners and/or edges. Also, the gelation process produces a coherent uniform particle rather than a layered particle which results from some mechanical balling processes. A mechanically formed particle may delaminate during an attrition process.

Another feature of this invention is the close control of the spheroid size. In a given batch, greater than 95% of the spheres will be within one mesh size, such as $-5+6$ or $-5+7$. Measurement with a micrometer shows that the spheroids are even more closely sized. There is only about a 0.015 inch variation in the major or minor axis of the spheroids. Thus, a controlled distribution of sphere sizes can be obtained by using the proper distribution of nozzle sizes. This can aid in controlling the pressure differential across a packed catalyst bed which is an important factor in auto emissions catalyst devices.

The properties of the spheroid product, when taken in toto define a unique particle which makes a superior catalyst support.

The support of this invention is characterized by low density, high degree of macroporosity, high crush strength, high temperature shrink resistance, good attrition resistance and controlled size and shape.

A catalyst comprising the support of this invention impregnated with a catalytically effective amount of at least one catalytically active metal or metal compound is highly effective in many catalytic systems particularly those that operate at high temperatures. Although the alumina itself may be active as a catalyst, it is usually impregnated with a suitable catalytic material and activated to promote its activity. The selection of the catalytic material, its amount, and the impregnation and activation procedures will depend on the nature of the reaction the catalyst is employed in. Preferably, the catalytically active metal is platinum group metal selected from the group consisting of platinum, palladium, ruthenium, iridium, rhodium, osmium, and combinations thereof.

In order to possess the high initial and sustained activity necessary to meet the increasingly stringent emission controls required by state and federal laws, the catalytic agents in a catalyst of this invention are distributed in particular positions within the catalyst particle. The catalytic agents which are typically used in automobile exhaust catalysts are the platinum group metals. Because of the great cost of these metals, it is uneconomical to use large quantities. Hence, it is important to position the metals in the most efficient as well as the most strategic manner. Suitable platinum group metals include, for example, platinum, palladium, rhodium, ruthenium, iridium, and osmium, as well as combinations thereof.

The use of platinum group metals in automobile exhaust catalysis has been constrained by the natural abundance of these metals. Since a large fraction of the world supply occurs in South Africa with the major metals being platinum, palladium and rhodium which occur naturally in the approximate proportions of 68 parts platinum, 27 parts palladium and 5 parts rhodium, the majority of work has been with the platinum group metals in these proportions. Typically, the total noble metal content of automotive exhaust catalysts, based on the weight of the catalyst, is from about 0.005 to 1.00 weight percent but preferably is from about 0.03 to 0.30 weight percent to be both economically as well as technically feasible. Of course, the optimum combination of metals is that which imparts specific performance benefits to the catalyst such as a higher level of palladium for more rapid oxidation of carbon monoxide and better thermal stability, or more platinum for greater poison resistance and better durability of hydrocarbon oxidation, or increased rhodium concentration for improved conversion of nitrogen oxides to nitrogen. Catalysts prepared according to this invention may contain only one of the platinum group metals, but usually contain several. The metal ratios may vary over a wide range of values but preferably the catalyst contains platinum and palladium in a weight ratio of about 5 parts to about 2 parts, respectively, or platinum, palladium and rhodium in a proportion of about 68 parts, 27 parts and 5 parts, respectively.

A variety of noble metal compounds are well-known and have been documented in the literature. The type of compound to be used depends largely on the nature of the surface of the support and the resulting interaction with it. For example, anionic or cationic forms of platinum may be introduced into the support by using $H_2PtCl_6$ or $Pt(NH_3)_4(NO_3)_2$, respectively.

The noble metal compound to be used should be introduced into the support such that once it is decomposed into the active form (metal or metal oxide) it will be highly dispersed and positioned in a specific location in the catalyst particle. We have found that there are preferred locations for the metals as well as preferred distribution of one metal with respect to another for a high degree of initial activity and which is especially important for sustained durability. The ability to control the location and dispersion depends on the noble metal compound used. We have found that of particular utility are those complexes described in U.S. Pat. No. 3,932,309 to Graham et al. In this method, the catalyst is prepared by impregnating the support with sulfite-treated platinum and palladium salt solutions. These sulfito complexes when applied to the support decompose to provide a high degree of dispersion. By varying the cationic form of the complex, for example, $NH_4^+$ or $H^+$ form, the depth of impregnation of the metal within the particle can be varied.

We have found that for high initial, and more importantly sustained activity, the noble metals should be positioned such that about 50% of the total noble metal surface area is deeper than about 50 microns. With regard to the specific location of the noble metals, we have found that the preferred location of the noble metals should be such that about 50% of the active metals is located deeper than about 75 microns. Determination of noble metal surface area is carried out by the hydrogen titration of oxygen. The detailed method for carrying out this determination is described by D. E. Mears and R. C. Hansford, *J. of Catalysis*, Vol. 9, 125-134 (1967). Elemental analysis is carried out using conventional analytical procedures. In order to determine the surface areas and noble metal concentration at particular depths within the catalyst particle, a method called the chloroform attrition method is employed. This method involves the agitating of a certain weight of catalyst in a liquid (chloroform) for a specified length of time dependent upon the amount of surface to be attrited off. The attrited material is separated from the unattrited remainder, dried and weighed. Knowing the initial dimensions of the catalyst particles as well as their geometry and weight, the depth removed can be determined. This attrited material is analyzed for its noble metal surface area and noble metal content. From these data the noble metal surface area and noble metal contents can be calculated as a function of depth into the catalyst particle.

The activity and durability of the catalysts were ultimately tested by several methods. Bench scale activity testing is carried out by a method which simulates the cold start that a catalyst experiences on a vehicle. Once the catalyst heats up, after a period of time it will reach essentially a steady state condition whereupon the efficiencies attain a level dependent upon the intrinsic activity of the catalyst. In the bench scale test, a 13 cm.$^3$ sample is contacted with sufficient total gas flow rate to achieve a gas hourly space velocity of 38,000 hr.$^{-1}$. The simulated exhaust contains 1700 ppm carbon as propane, 4.5 volume percent carbon monoxide with the balance made up by nitrogen. The preheated gas, if containing no oxidizable species, would heat up the bed to 700° F. However, due to the presence of carbon monoxide and hydrocarbon, the temperature climb in the bed is accelerated due to the exothermic oxidation reactions. In this test the parameters of importance are the rapidity of lightoff as measured by the time to reach 50% conversions of carbon monoxide and hydrocarbon and the carbon monoxide and hydrocarbon conversion efficiencies which occur when the catalyst reaches essentially a steady state condition. The catalysts of this invention exhibit very short times to reach 50 percent conversions and have very high conversions of hydrocarbon and carbon monoxide.

In order to assess the durability of catalysts upon exposure to fuel additives which contain lead, sulfur, and phosphorus along with the phenomena of varying temperature conditions, the catalysts are aged on a pulse flame combustor system. In this system a fuel doped with all the poison precursors one finds in current fuels is burned resulting in the deposition of poisons such as lead, sulfur and phosphorus compounds on the catalyst. The fuel which is hexane doped with tetramethyl lead antiknock mix, trimethyl phosphite and thiophene contains the equivalent of 0.23 g. lead per gallon, 0.02 g. phosphorus per gallon and 0.03 weight percent sulfur. The fuel flow is 15 ml. per hour. Nitrogen and oxygen are mixed in amounts of 2000 and 500 standard cubic centimeters per minute, respectively. An additional 50 standard cubic centimeters of oxygen is added after the point of combustion to ensure an oxidizing environment. A detailed explanation of the operation of a pulse flame combustor operation was presented by K. Otto, R. A. Dalla Betta and H. C. Yao, *J. Air Pollution Control Association*, Vol. 24, No. 6, pp. 596-600, June 1974. A 13 cm.$^3$ sample is exposed to repetitive temperature cycling consisting of one hour at 1300° F. and 2 hours at 1000° F. Temperatures are the average bed temperatures. During prolonged aging periods of up to 500 hours the sample is periodically checked for activity by removing it from the pulsator unit and testing it on the bench scale activity unit. The small scale activity and aging tests are valuable in screening many catalysts; however, the ultimate test is the full size vehicle or engine dynamometer evaluation. A detailed description of an engine dynamometer test is reported by D. M. Herod, M. V. Nelson and W. M. Wang, *Society of Automotive Engineers*, Paper No. 730557, May 1973. This test is similar to the bench scale activity test reported earlier. The ambient temperature catalyst contained in a full size converter is contacted with the hot exhaust from a closely controlled engine. The conversions of carbon monoxide and hydrocarbon and nitrogen oxides are monitored as a function of time. Correlations have been developed which allowed prediction of how the catalyst would perform if tested in an actual CVS test run by the Federal Test Procedure as detailed in the Federal Register of July, 1970 and as modified by the instructions in the Federal Register of July 2, 1971. Durability testing of full size converter charges of catalysts is carried out by the method outlined by J. P. Cassassa and D. G. Beyerlin, *Society of Automotive Engineers*, Paper No. 730558, May 1973.

Once the catalyst has passed laboratory and engine dynamometer activity and durability testing, it then undergoes fleet testing on standard production type vehicles. The vehicles are tested according to the Federal Test Procedure noted previously and hereby incorporated by reference. The procedure is designed to determine the hydrocarbon, carbon monoxide and oxides of nitrogen in gas emissions from an automobile while simulating the average trip in an urban area of 7½ miles from a cold start. The test consists of engine start up and vehicle operation on a chassis dynamometer through a specified driving schedule consisting of a total of 1,371 seconds. A proportionate part of the diluted gas emissions is collected continuously for a subsequent analysis using a constant volume sampler.

The dynamometer run consists of two tests, a cold start test after a minimum of 12 hours wait, and a hot start test with a 10-minute wait between the two tests. Engine start up and operation over a driving schedule and engine shutdown constitute the complete cold start test. Engine start up and operation over the first 505 seconds of the driving schedule complete the hot start test.

The engine emissions are diluted with air to a constant volume and a portion sampled in each test. Composite samples are collected in bags and analyzed for hydrocarbons, carbon monoxide, carbon dioxide and oxides of nitrogen. Parallel samples of diluted air are similarly analyzed for hydrocarbons, carbon monoxides and oxides of nitrogen. Vehicle aging of the catalyst is carried out following the driving schedule as set forth in Appendix "D" schedule in the Federal Test Procedures, noted previously. This schedule consists of eleven 3.7 mile laps of stop and go driving with lap speeds varying 30-70 mph., repeated for 50,000 miles.

The average speed is 29 mph. Periodically the vehicles are tested on a chassis dynamometer to assess the durability of the emission control system.

Catalysts designed for three-way control of carbon monoxide, hydrocarbons and nitrogen oxides require a support of good physical integrity because of the variation in reducing or oxidizing nature of the exhaust environment. Furthermore, they especially require a support having low density and a high degree of macroporosity because of the inherent difficulty in achieving good carbon monoxide removal and the quick lightoff needed for good all-round performance. Since rhodium is typically the catalytic agent added for improved three-way control and coupled with its being a rather scarce resource, it must be used efficiently and placed strategically. Similar to the case of oxidation catalysts, three-way catalysts have high initial activity as well as good sustained performance when the active metals are properly positioned. We have found that for combined high initial activity and sustained catalytic durability, the noble metals should be located such that about 50% of the total noble metal lies deeper than about 75 microns.

Laboratory determination of three-way catalyst activity is made by contacting 13 cm.$^3$ of the catalyst with sufficient gas flow to reach a gas hourly space velocity of 40,000 hr$^{-1}$. The gas composition consists of 1% carbon monoxide, 250 ppm hydrocarbon consisting of a 3/1 mixture of propylene and propane, 0.34% hydrogen, 1000 ppm NO, 12% carbon dioxide, 13% water and varied oxygen contents to change the exhaust gas environment from reducing to oxidizing in nature. Nitrogen is added as the balance. The measure ($\phi$) of reducing or oxidizing nature of the exhaust gas environment is given by the following:

$$\phi = \frac{\text{Actual Concentration of Oxygen in the Feed Composition}}{\text{Oxygen Concentration Required for Stoichiometry}}$$

The catalyst is evaluated at various values of $\phi$ and at various steady state temperatures.

Bench scale durability is carried out in essentially the same way as in the case of oxidation catalysts. Periodic activity checks are run during the aging schedule.

Full scale engine or chassis dynamometer evaluation in technically and economically feasible systems is carried out with close control of air/fuel ratios. Aging is carried out in systems with similar control of the exhaust gas environment to which the catalyst is exposed. Periodic checks of three-way performance are made during the aging schedule.

The catalysts of this invention have been tested by a number of methods which have been developed by the automobile manufacturers to measure catalytic performance. One particular test measures conversion efficiency at a temperature of 1000° F. and a gas hourly space velocity of 75,000 hour$^{-1}$. The test is particularly discriminative in determining the relative ability of catalysts to oxidize hydrocarbons. Below are typical ranges of performance for highly preferred catalysts of our invention compared to those achieved by typical catalysts of current manufacture.

| | HC EEfficiency | |
|---|---|---|
| | Fresh | Aged 24 Hours 1800° F. |
| Catalysts of this Invention | 64–65% | 40–44% |

| | HC EEfficiency | |
|---|---|---|
| | Fresh | Aged 24 Hours 1800° F. |
| Catalysts of Current Manufacture (Typical) | 38–41% | about 35% |

HC Efficiency = hydrocarbon converrsion efficiency at steady state

Another useful test that has been used to differentiate catalysts of our invention from those of current manufacture is one that measures the temperatures at which fifty percent of the carbon monoxide in the test gas mixture is oxidized at a gas hourly space velocity of 1400 hour$^{-1}$. Low temperature results mean high activity. Below are typical ranges of performance of highly preferred catalysts of our invention compared to those of typical catalysts of current manufacture:

| | Temperature for 50% Carbon Monoxide Conversion | |
|---|---|---|
| | Fresh | Aged 24 hrs. at 1800° F. |
| Catalysts of our Invention | 225–230° F. | 265–300° F. |
| Catalysts of Current Manufacture | 300–315° F. | 350–370° F. |

Because of the low density and macroporosity of the spheroids of this invention, the catalytic agents, for example, the platinum group metals, when applied to specific locations and in specific distributions within the catalyst can be utilized very efficiently. Because of this efficient usage, the catalyst need not be loaded with noble metals to a level which exceeds its economic limits. Hence, the ranges of total noble metal loading are:

| | Broad Range | Normally |
|---|---|---|
| Total Noble Metal Loading Weight Percent | 0.005–1.0 | 0.03–0.30 |

The particular choice of catalytic agents used depends upon the performance characteristics desired in the system. Principally, the noble metals used in automobile exhaust emission control are platinum, palladium, and rhodium and mixtures thereof.

The approximate ranges of these principal components are:

| | Broad Range | Normally Preferred |
|---|---|---|
| Platinum (% of total) | 0–100% | 65–75% |
| Palladium (% of total) | 0–100% | 25–35% |
| Rhodium (% of total) | 0–20% | 5–15% |

Because of the high degree of macroporosity built into the support, the noble metals may be positioned deeper than in typical catalysts of current manufacture, and as a result they are highly dispersed and more resistant to crystallite growth. Hence, the catalysts are characterized as having high and stable metal surface areas. The following ranges distinguish advanced catalysts of our invention from typical catalysts of current manufacture:

| Noble Metal Surface Area (micromoles of H₂ per gram of catalyst with a metal loading of 0.332 troy ounces/ft.³) | | |
| --- | --- | --- |
|  | Fresh | Aged 24 Hours 1800° F. |
| Catalysts of this Invention |  |  |
| Broad Typical | 3.8–7.6 | 0.5–0.7 |
| Catalysts of Current Manufacture |  |  |
| Broad Typical | 0.6–3.5 | 0.0–0.1 |

The catalysts of our invention are further characterized by the specific depths to which the catalytic agents are deposited. There are pronounced differences between the catalysts of our invention compared to typical catalysts of current manufacture as noted below:

|  | Approximate Maximum Depth of Noble Metal Penetration |
| --- | --- |
| Catalysts of our Invention |  |
| Broad Typical | 150–400 microns |
| Preferred | 150–250 microns |
| Catalysts of Current Manufacture |  |
| Broad Typical | 30–125 microns |

Because of the specific performance characteristics that we build into our catalyst by changing the distribution and location of the various noble metals, those distributions and locations are distinguishing characteristics of the catalyst of our invention. Although the overall proportions of the catalyst as a whole may be fixed, the distribution of these components is specifically located in the catalysts of our invention. The following indicates the preferred ranges of depths and distributions that characterize the catalysts of our invention:

|  | Approximate Maximum Depth of Penetration |
| --- | --- |
| Platinum |  |
| Broad Typical | 125–400 microns |
| Preferred | 125–250 microns |
| Palladium |  |
| Broad Typical | 125–400 microns |
| Preferred | 125–250 microns |
| Rhodium |  |
| Broad Typical | 125–250 microns |
| Preferred | 125–200 microns |

Catalysts of our invention are characterized by the following performance characteristics which distinguish them from typical catalysts of current manufacture.

| Parameter | Fresh Laboratory Dynamic Heat-up Activity | | Laboratory Dynamic Bench Heat-up Activity after 500 hours of Pulsator Aging | |
| --- | --- | --- | --- | --- |
|  | ᵗ50 CO Typical | HC Efficiency Typical | ᵗ50 CO Typical | HC Efficiency Typical |
| Catalysts of our Invention | 40–50 sec. | 75–95% | 65–95 sec. | 35–50% |
| Catalysts of Current Manufacture | >60 | 55–75% | >135 sec. | 10–20% |

ᵗ50 CO = time in seconds for 50% carbon monoxide conversion.

The following examples illustrate specific embodiments of the invention.

EXAMPLE 1

This example illustrates the preparation of an alumina composition of this invention.

Alumina trihydrate was completely dissolved in sodium hydroxide to provide a sodium aluminate solution containing 20 percent $Al_2O_3$ and having a $Na_2O/Al_2O_3$ mole ratio of 1.40. 495 grams of water were added to a reaction vessel and then 631 milliliters of 50 percent sodium hydroxide solution were added. This volume of sodium hydroxide solution corresponded to 966 grams at the specific gravity of the solution of 1.53 g./cm.³. The mixture was stirred gently and heated to 200° F. A total of 672 grams of alumina trihydrate was added gradually over a period of 30 minutes. During the addition of the alumina trihydrate, the mixture was heated to a gentle boiling and stirred slowly. Gentle boiling and stirring were then continued for another 60 minutes or until all the trihydrate was dissolved. Heating was stopped and the mixture cooled with stirring to 140° F.

The specific gravity and temperature of the sodium aluminate solution were adjusted to 1.428 g./cm.³ and 130° F. respectively by adding 290 grams of water at a temperature of 140° F. and stirring the mixture. 2016 grams of the solution were used for the preparation of the alumina.

2286 grams of an aluminum sulfate solution containing 7 percent $Al_2O_3$ and having a specific gravity of 1.27 g./cm.³ at 25° C. and a $SO_4^=/Al_2O_3$ mole ratio of 3.01 were prepared by dissolving 1373 grams of aluminum sulfate crystals in 1963 grams of water.

The sodium aluminate solution and the aluminum sulfate solution were heated to 145° F. A heel of 3160 grams of water was placed in a strike tank, the agitator was started, and the heel heated to 155° F.

The heel was acidified to a pH of 3.5 by the addition of 6 milliliters of aluminum sulfate at an addition rate of 36 ml./minute and aged for 5 minutes. At the conclusion of the aging period, the flow of sodium aluminate was started at a rate of 28 ml./minute. Within 5 seconds, the flow of aluminum sulfate was resumed at 36 ml./minute and maintained constant through the 50 minute strike phase. The flow of sodium aluminate was adjusted as needed to maintain the pH of the reaction mixture at 7.4. The strike temperature was maintained at 163° F. by heating the strike tank.

In 50 minutes, all of the aluminum sulfate solution had been added and 317 grams of sodium aluminate remained.

At the conclusion of the strike, the pH of the reaction mixture was increased to 10.0 by adding 29 more grams of sodium aluminate solution. The final molar ratio of $Na_2O$ to $SO_4^=$ was 1.00. The solution was stabilized by aging for 30 minutes at a constant temperature of 163° F.

After aging, the reaction mixture was filtered and washed. For every gram of alumina in the mixture, 50 grams of wash water were used. A standard filtration-wash test was defined as follows. Reaction slurry (600 ml.) was filtered in an 8 inch diameter crock using Retel filter cloth, material no. 80, at 10 inches of vacuum. It was washed with 2.5 liters of water. The filtration time was 2.1 minutes and the filter cake was 7 mm. thick.

The filter cake was reslurried at 15% solids and spray-dried at an outlet temperature of 250° F. to a powder having a total volatiles (T.V.) content of 27.5%, as measured by loss on ignition at 1850° F. The dried powder was calcined at 1850° F. for 1 hour.

The properties of the dry product and the calcined product are shown in Table 1.

TABLE 1

| Dry Powder | |
|---|---|
| Wt. % $Na_2O$ | 0.02 |
| Wt. % $SO_4^=$ | 0.20 |
| Wt. % T.V. | 27.5 |
| Agglomerate Size | 21.5μ |
| Bulk Density | 24.1 lbs./ft.$^3$ |
| X-Ray Phases | (boehmite-pseudoboehmite intermediate)- no alpha or beta trihydrate phases present peak for [020] crystallographic plane falls at d spacing of 6.37A. |
| Calcined Powder at 1850° F. For 1 Hour | |
| $N_2$ Surface Area | 136 m.$^2$/g. |
| $N_2$ Pore Volume, <600A | 0.72 cm.$^3$/g. |
| total | 0.95 cm.$^3$/g. |
| X-Ray Phases | theta alumina, no alpha alumina present |
| Pore Size Distribution | A nitrogen PSD measurement showed that all the pores were greater than 100A diameter and that 50% of the pores were in the 100–200A diameter range. |

EXAMPLE 2

Given below in Table 2 is a summary of results of 13 runs using the process conditions described in Example 1.

TABLE 2

| Properties | Average |
|---|---|
| No. of Runs | 13 |
| Wt. $Al_2O_3$/Run (lbs.) | 1 |
| Strike Ratio-$Na_2O/SO_4^=$ | 0.93 |
| Standard Filtration Test (min.) | 2.4 |
| Spray Dried Powder | |
| Wt. % $Na_2O$ | 0.03 |
| Wt. % $SO_4^=$ | 0.19 |
| Wt. % T.V. | 27.9 |
| Bulk Density (lbs./ft.$^3$) | 24.0 |
| $N_2$ Surface Area at 750° F. for 30 minutes (m.$^2$/g) | 420 |
| $N_2$ Pore Volume at 750° F. for 30 minutes (cm.$^3$/g.) <600A | 0.82 |
| X-Ray | Intermediate Boehmite-Pseudoboehmite |
| Calcined Powder at 1850° F. for 1 Hour | |
| Surface Area (m.$^2$/g.) Pore Volume (cm.$^3$/g.) | 131 |
| Total | 1.01 |
| <600 A | 0.73 |
| X-Ray | Theta alumina, no alpha alumina present |

EXAMPLE 3

Given below in Table 3 is a summary showing the results for the blended products of six large scale runs. The process was the same as in Example 1 except that 195 lbs. of alumina (dry basis) were made per run. Equipment size and amounts of material were scaled up proportionately. The results were the same as in laboratory scale runs showing that the process could be readily scaled up.

TABLE 3

| Spray Dried Powder | |
|---|---|
| Wt. % $Na_2O$ | 0.059 |
| Wt. % $SO_4^=$ | 0.31 |
| Wt. % $CO_2$ | 1.37 |
| Wt. % T.V. | 29.6 |
| Bulk Density (lbs./ft.$^3$) | 30.0 |
| $N_2$ Surface Area at 750° F. (m.$^2$/g.) | 413. |
| $N_2$ Pore Volume at 750° F. (cm.$^3$/g.) <600A | 0.77 |
| X-Ray Phases | Intermediate Boehmite-Pseudoboehmite |
| Calcined Powder - 1850° F./1 Hr. | |
| $N_2$ Surface Area (m.$^2$/g.) | 131 |
| $N_2$ Pore Volume (cm.$^3$/g.) Total | 0.97 |
| <600A | 0.70 |
| X-Ray Phases | Theta alumina, no alpha alumina present |

EXAMPLE 4

The process conditions shown in Example 1 were important to obtain an easily filterable, pure product. In runs where the process conditions of Example 1 were employed except that the reaction temperature and time were varied, the following results were obtained.

TABLE 4

| | Reaction Temperature | | |
|---|---|---|---|
| | 75° F. | 120° F. | 163° F. |
| | Reaction Time | | |
| | 50 min. | 25 min. | 50 min. (Example 1) |
| Strike Ratio ($Na_2O/SO_4^=$) | 0.76 | 0.77 | 0.91 |
| Standard Filtration Time Test (min.)φ | 2.8 | 9.0 | 2.1 |
| Wt. % $SO_4^=$ | 9.5 | 0.19 | 0.20 |

Thus, a decrease in process temperature led to an increase in sulfate content. A decrease in process time leads to an increase in filtration time.

EXAMPLE 5

This example illustrates the treatment of a washed alumina filter cake prepared in accordance with the procedure of Example 3 with acetic acid before spray drying. The acetic acid has the effect of decreasing the absorption of carbon dioxide during spray drying. In each run glacial acetic acid was added to the filter cake to a pH of 6.0 and the mixture agitated. The spray dried product contained 3.8 percent acetic acid and 64.5 percent alumina. This represents 0.1 moles of acetate ion for each mole of alumina.

The properties of the alumina products of Example 3 and this Example are shown in Table 7. The carbon dioxide content is 0.76% compared to 1.37% present in the alumina of Example 3.

TABLE 5

|  | Example 3 | Example 5 |
|---|---|---|
| Spray Dried Powder | | |
| Wt. % $Na_2O$ | 0.059 | 0.053 |
| Wt. % $SO_4^=$ | 0.31 | 0.50 |
| Wt. % Solids . ($Al_2O_3$) | 63.8 | 64.5 |
| Wt. % $CO_2$ | 1.37 | 0.76 |
| X-Ray | Intermediate Boehmite-Pseudoboehmite | Intermediate Boehmite Pseudoboehmite |
| Calcined Powder 1850° F./1 Hr. | | |
| $N_2$ Surface Area (m.$^2$/g.) | 131 | 118 |
| $N_2$ Pore Volume (cm.$^3$/g.) <600A | 0.70 | — |
| X-Ray | theta alumina, no alpha alumina present | theta alumina, no alpha alumina present |

EXAMPLE 6

In order to illustrate the relative proportions of crystalline material and amorphous material in the alumina of this invention, samples of the alumina of Example 1 and aluminas A and B that exhibit lower and higher degrees of crystallinity respectively were slurried with deionized water at $Al_2O_3$ concentrations of 100 g. $Al_2O_3$ (dry basis) in one liter of water. Potentiometric titrations of each slurry were slowly conducted at a rate of addition of 1.1 N sulfuric acid of 1 ml./minute over the pH range of 8.3 to 4.0 in which alumina is insoluble.

TABLE 6

| | Volume of 1.1N $H_2SO_4$ Solution Required To Reach Indicated pH | | |
|---|---|---|---|
| | Example 1 | A | B |
| d [020] spacing | 6.37A | 6.56A | 6.11A |
| midpoint width of peak [020] | 1.78A | 1.98A | 0.18A |
| pH | | | |
| 8.3 | 0 | 0 | 0 |
| 7.0 | 36 | 47 | 14 |
| 6.0 | 90 | 120 | 25 |
| 5.0 | 117 | 156 | 36 |
| 4.0 | 150 | 193 | 47 |

The results show that the alumina compositions of this invention required intermediate amounts of acid to effect the same pH change and thus had a gel content intermediate between A and B.

EXAMPLE 7

The degree of crystallinity of the alumina compositions of this invention was further demonstrated by X-ray diffraction measurements of the development of beta alumina trihydrate on alkaline aging and heating. 100 gram samples (dry basis) of alumina A as shown in Table 6 and the alumina prepared in Example 3 as shown in Table 3 were slurried in 250 milliliters of deionized water and brought to pH 10 by the addition of 1 N NaOH solution. The time and temperatures of aging and the height of the high and low intensity X-ray peaks of alumina A for beta trihydrate are shown in Table 7. No detectable beta trihydrate was present in the alumina composition of Example 3 under the same conditions of aging and heating as alumina A.

TABLE 7

| Time/Temperature | 4.72 A Peak Height (mm.) | 4.35 A Peak Height (mm.) |
|---|---|---|
| 18 hrs./50° C. | 8 | 8 |
| 24 hrs./50° C. | 11 | 8 |
| 41 hrs./50° C. | 10 | 12 |
| 4 hrs./90° C. | 12 | 14 |
| 21 hrs./90° C. | 18 | 14 |

The ease of formation of beta trihydrate under alkaline conditions of Sample A indicated a higher gel content than in the alumina of Example 3.

EXAMPLE 8

In a series of runs, five cubic feet of spheroidal alumina particles with an average bulk density of 28 pounds per cubic foot were prepared using a mixture of (1) a blend of the products of the runs of Example 3 and (2) the acetic acid treated alumina of Example 5. An 80/20 mix of plain alumina to acetate alumina was used and slurried in nitric acid, acetic acid, and water. The composition of the mixture was:

| | |
|---|---|
| Example 3 Alumina (63.8 Wt. % $Al_2O_3$) | 1919 g. |
| Example 5 Alumina $\left( \begin{array}{c} 64.5 \text{ Wt. \% } Al_2O_3 \\ 3.8 \text{ Wt. \% } H_3CCOOH \end{array} \right)$ | 475 g. |
| 1.5M $HNO_3$ | 600 ml. |
| 1.5M $CH_3COOH$ | 1000 ml. |
| Water | 1780 ml. |
| Nominal Composition of above mix. | |
| $(Al_2O_3)_{1.00}(CH_3COOH)_{0.12}(HNO_3)_{0.06}(H_2O)_{15.34}$ | |

The liquids were mixed together in a five gallon bucket and blended with the alumina of Example 3 using a Cowles Dissolver with a three inch diameter blade turning at 3500 R.P.M. A 20 minute blending was used. The acetate alumina was then added and the slurry was blended for another 20 minutes. Viscosity of the slurry immediately after blending was 78 cps as measured with a Brookfield viscometer. The initial viscosity varied between 60 to 100 cps. The slurry was aged to a viscosity of 500 to 1000 cps. before being used for sphere forming. After aging, the pH's of the slurry varied between 4.1 and 4.5 in the runs.

After aging, the alumina slurry was pumped to a pressurized feed tank that was 5 inches in diameter and 4 inches high. The slurry was continuously circulated between the feed tank and a reservoir tank to maintain the viscosity of the slurry. The alumina slurry feed flowed under air pressure of 0.5 to 1.5 p.s.i.g. from the feed tank to the nozzle holder. The droplet formation rate varied between 140 and 170 drops/minute. The nozzle holder could hold up to nineteen 2.7 mm. internal diameter nozzles in a regular array. 7 to 14 nozzles were used per run and the extra openings in the nozzle holder were used as spares in case any of the original nozzles clogged. The nozzle holder contained air channels to provide a linear air flow of 100 cm./ minute around the nozzle tips and prevent ammonia vapor from prematurely gelling the alumina droplets.

The 2.7 mm. internal diameter of the droplet nozzle was selected to give about ¼ inch diameter (minor axis) calcined spheres. The lip thickness was 0.6 mm. The 3.3 mm. nozzle holes opened to ½ inch diameter, ½ inch long cylindrical holes cut in the bottom of the holder. The ends of the stainless steel nozzles were recessed ⅛ inch from the bottom of the holder and the bottom of the nozzle holder was ¼ inch above the organic phase of the column.

With a slurry viscosity of 700 cps. and a feed pressure of ½ p.s.i.g. a droplet rate of 170 drops per nozzle per minute could be maintained using seven nozzles. It took 1¼ hours to form the slurry batch into droplets.

A glass sphere-forming column was employed. The column was 9 feet high and 4 inches in diameter. The column was filled with kerosene (no. 1 grade) and 28% aqueous ammonia. The top six feet of the column contained the kerosene. The remainder of the column was filled with the aqueous ammonia. The aqueous ammonia was mixed with 1.3 wt.% ammonium acetate and 0.83 wt.% ammonium nitrate as measured under steady state operating conditions. The kerosene was ammoniated to a concentration range of 0.03–0.08 wt.% ammonia. The kerosene also contained 0.2 volume % Liquinox.

A glass column 4 feet high by 3 inches diameter was used to ammoniate the kerosene. The column was half filled with ceramic saddles. Kerosene was pumped from the top of the sphere forming column at a rate of approximately one liter per minute to the top of the ammoniating column. Ammonia gas flowed into the bottom of this column. The ceramic saddles broke up the stream of ammonia bubbles permitting a more efficient ammoniation of the kerosene. Ammoniated kerosene was pumped from the bottom of the ammoniator column to the bottom of the kerosene layer in the spheroid forming column. An ammonia concentration gradient existed within the kerosene phase of the spheroid forming column. The top of the kerosene phase had the least ammonia. The ammonia concentration at the top of the kerosene phase was maintained between 0.03 and 0.08 wt.%. The concentration was determined by titration with HCl to a bromthymol blue endpoint.

A batch collection system was used. An 8 liter bottle was connected to the bottom of the spheroid forming column by detachable clamps. A one inch diameter ball valve was used to seal off the bottom of the column when the collection bottle was detached. The collection bottle was filled with 28% aqueous ammonia. An overflow reservoir was connected to the collection bottle to catch the aqueous ammonia displaced by the spheroids. When the collection bottle was full the spheroids were poured into a plastic basin where they were aged in contact with 28% aqueous ammonia for one hour prior to drying.

A forced air drying oven was used. The spheroids were dried in nesting baskets with a 20 mesh stainless steel screen bottom. The top of each basket was open to the bottom of the basket above it. The top basket was covered. The bottom basket contained a charge of previously formed spheroids saturated with water. Because the sides of the baskets were solid the flow of water vapor during drying was down and out through the bottom of the stack of baskets. A humid drying atmosphere was maintained in this manner to prevent spheroid cracking. Drying temperature was 260° F. A 30 ft. long, gas fired tunnel kiln with a 14 inch square opening was used to calcine the spheroids at 1900° F. for one hour.

A summary of the run conditions and properties of the calcined spheroids for this example are given in Table 8.

A summary of the properties of the approximately three cubic foot blend of calcined spheroids formed in a series of runs by the conditions of this example are shown in Table 9. The spheroid bulk density and average crush strength were relatively uniform. Attrition and shrinkage were low.

TABLE 8

| Slurry | |
|---|---|
| Wt. % Al$_2$O$_3$; Nominal | 26.5 |
| Actual* | 27.6 |
| Blend Time (Min.) | 20 + 20 |
| pH | 4.39 |
| Aging Before Run (Hours) | 4.5 |
| Run Viscosity; Initial (cps.) | 700 |
| 1900° F. Calcination | |
| Bulk Density (lbs./ft.$^3$) | 28.2 |
| Crush Strength (lbs.) | 9.0 |
| Range - High | 11.5 |
| - Low | 7.5 |
| Major Axis (mils) | 148 |
| Minor Axis (mils) | 130 |
| Major/Minor Axis ratio | 1.14 |

TABLE 9

| | |
|---|---|
| Weight (lbs.) | 78.7 |
| Volume (ft.$^3$) | 2.74 |
| Bulk Density (lbs./ft.$^3$) | 28.7 |
| Average Crush Strength (lbs.) | 10.5 |
| % Attrition | 0.5 |
| % Shrinkage | 3.5 |
| Sphericity (Major Axis/Minor Axis) | 1.13 |
| Average Diameter (mils) | 135 |
| N$_2$ Surface Area (m.$^2$/g.) | 107 |
| X-Ray | Theta alumina, no alpha alumina |

EXAMPLE 9

This example illustrates the unique suitability of the alumina compositions of this invention for the formation of spheroidal alumina particles.

In Table 10, the slurry and spheroid forming properties of three conventional alumina powders are compared with those of three different powders produced by the power formation process of Example 3. The process described in Example 8 was used to produce the slurries and spheroids.

With both C and D alpha alumina monohydrate powders, it was necessary to use a lower solids content in the slurry. With a higher solids content than those used, the slurries set solid in a few minutes. Also, with the C alumina, it was necessary to use a higher alumina-acid ratio. At the standard ratio, the slurry set up while blending.

The C and D aluminas resulted in high bulk density spheroids. Although the same size nozzles were used in all cases, these two aluminas formed spheroids which were much smaller than the spheroids formed by the alumina compositions of this invention.

A crystalline alpha alumina monohydrate E was made by heating Alcoa C-30D alpha alumina trihydrate to 300° F. for 4 hours. A slurry made at the standard alumina-acid ratio had a pH of 3.2. The solids settled out immediately after blending. When the alumina-acid ration was doubled (to 1/0.09) the pH was 3.9, but the solids still settled out immediately after blending.

TABLE 10

| Powder | Example 3 | Powders | C | D | E |
|---|---|---|---|---|---|
| Powder Properties | | | | | |
| % Total Volatiles | 25.6 | 24.2 | 24.4 | 25.1 | 21.5 21.3 |
| Crystallographic Form as is | Alpha Alumina Monohydrate | | | | |
| Crystallographic Form, 1900° F. for 1 Hour | Theta Alumina | | | | Kappa Alumina |
| $N_2$ Surface Area, 1900° F. for 1 Hour (m.$^2$/g.) | 125 | 122 | 133 | 105 | 124 21 |
| $N_2$ Pore Volume, <600A, (cm.$^3$/g.) at 1900° F. for 1 hour | 0.70 | 0.67 | 0.63 | 0.40 | 0.54 0.1 |
| Slurry Forming | | | | | |
| % Solids | 27.6 | 27.5 | 32.0 | 19.1 | 23.4 30 |
| Mole Ratio; $Al_2O_3$/Acids | 1/0.18 | 1/0.18 | 1/0.18 | 1/0.09 | 1/0.18 1/0.18 |
| Slurry pH | 4.4 | 4.5 | 4.1 | 4.5 | 4.5 3.2 |
| Initial Viscosity, (cps.) | 84 | 320 | 400 | 400 | 220 5 |
| Time to reach 1000 cps. | 4 hours | 1 hour | 2 hours | 10 min. | 1 hour Settled out |
| Sphere Properties After 1900° F. Calcination | | | | | |
| Crystallographic Form | Theta Alumina | | | | |
| $N_2$ Surface Area (m.$^2$/g.) | 123 | 110 | 104 | 103 | 108 |
| $N_2$ Pore Volume, <600A (cm.$^3$/g.) | 0.59 | 0.60 | 0.61 | 0.39 | 0.58 |
| Bulk Density | 28.2 | 28.7 | 28.1 | 55.6 | 52.4 |
| Average Crush Strength (lbs.) | 9.0 | 10.0 | 13.4 | 18.9 | 21.3 |
| Major Axis Diameter (mils) | 148 | 141 | 155 | 102 | 116 |
| Minor Axis Diameter (mils) | 130 | 118 | 121 | 92 | 98 |

The following examples illustrate the preparation and testing of the catalyst of this invention.

EXAMPLE 10

An alumina slurry feed was made from an alumina powder which has the following characteristics:

0.08 wt.% $Na_2O$
0.43 wt.% $SO_4^=$
0.095 wt.% CaO
0.022 wt.% MgO
29.4 wt.% Total Volatiles
0.85 cm.$^3$/g. $N_2$ Pore Volume
300 m.$^2$/g. $N_2$ Surface Area at 1000° F.
X-ray diffraction shows alpha alumina monohydrate with the reflection occurring at 6.6 A The slurry had the following composition:
17.5 wt.% alumina
4.2 wt.% nitric acid (0.38 moles $HNO_3$/mole $Al_2O_3$)

The slurry was formed by hand stirring. It was aged for 2 days. Spheroids were formed in a 1-inch diameter column. Kerosene was the water immiscible phase. The aqueous phase contained about 28 weight percent ammonia. Three 175 g. batches were made and combined. The samples were calcined at 1000° F. for 3 hours. The properties of the spheroids were:

| | |
|---|---|
| Bulk Density: | 28.6 pcf. |
| Crush Strength: | 13.2 lbs. |
| Water Pore Volume: | 1.08 cm.$^3$/g. |
| Size: | −6 + 7 mesh |

After calcination at 1850° F. for 1 hour, it had:

| | |
|---|---|
| Bulk Density: | 34.3 pcf. |
| Crush Strength: | 10.0 lbs. |

Noble metal catalysts were prepared on the calcined substrates. The concentration was 0.04 troy oz./260 cu. in. in a 1 to 3 Pt/Pd weight ratio. In a dynamic heat-up oxidation activity test, the following results were obtained:

| | Fresh | 24 Hrs./1800° F. |
|---|---|---|
| CO Index | 0.677 | 0.925 |
| HC Efficiency, % | 94.8 | 78.9 |

These tests were conducted in accordance with the procedure of U.S. Pat. No. 3,850,847 to Graham et al, except that the simulated exhaust gas contained 1700 ppm carbon as propane.

The sample had excellent catalytic activity and stability for both carbon monoxide and hydrocarbon conversion.

EXAMPLE 11

Spheroidal alumina particles prepared in accordance with the procedure of Example 8 had the properties shown in Table 11.

1900 grams of these particles were impregnated to incipient wetness with a solution prepared as follows:

$SO_2$ was bubbled into 800 ml. deionized water for 17 minutes at 1 m. mole/minute after which 4.213 ml. of Pd $(NO_3)_2$ solution containing 105 mg. palladium per ml. was added. The resulting solution is yellowish green indicating complexing of the palladium to a degree of 4 moles $SO_2$/g. atom palladium.

A solution of ammonium platinum sulfito salt, $(NH_4)_6$ Pt $(SO_3)_4 \cdot XH_2O$, was prepared by dissolving 3.678 g. having a platinum content of 30.67% in 700 cc. water.

The palladium solution was then added to the platinum solution. The total volume was then increased to 1938 ml. by the addition of additional deionized water. The solution was applied via a stream to the rotating support. Once impregnation was complete, the support was placed on screens and oven dried at 320° F. (forced draft). After overnight drying it was activated at 800° F. for 1 hour in air.

TABLE 11

| | |
|---|---|
| Bulk Density | 28.0 |
| Crush Strength (lbs.) | 9.7 |
| Attrition % | 0.20 |

TABLE 11-continued

| | |
|---|---|
| Sphericity (Major Axis/Minor Axis) | 1.1 |
| Surface Area (m.²/g.) | 104.0 |
| X-Ray | theta alumina, no alpha alumina present |

The bench and engine ddynamometer, and vehicle test results for this catalyst are shown in Table 12 and the bench activity during aging on the pulse flame combustor are shown in Table 13. The catalyst exhibited high hydrocarbon conversion efficiency in the High Space Velocity test. It also was determined to have very low temperatures for 50% carbon monoxide and hydrocarbon conversion in the static bench test. The dynamometer aging data indicated good performance after 1000 hours of engine aging. The catalyst was also aged on a vehicle in fleet tests and the results were quite similar to those obtained in aging on an engine dynamometer. As observed in full scale engine tests, the light off (t50$_{CO}$) parameter as determined after extensive pulsator aging was quite good.

In tables which follow, the abbreviations used have the following meaning:

HSV = High Space Velocity
GHSV = Gas hourly space velocity
Cat. = Catalyst of the present invention
Std. = standard or reference catalyst typical of current commercial catalyst in use in the U.S.A.
CVS = Constant volume sampling as per standard Fed. test procedure.
ND = Not determined
HC = Hydrocarbons

TABLE 12

Bench Test Results

| | Fresh | | | | Aged*** | | | |
|---|---|---|---|---|---|---|---|---|
| | HSV* | | Static** | | HSV | | Static | |
| | HC | CO | HC | CO | HC | CO | HC | CO |
| Cat. | 65 | 100 | 230 | 225 | 40 | 100 | 275 | 265 |
| Std. | 38 | 100 | 311 | 313 | 35 | 100 | 369 | 370 |

*Conversion efficiency at 1000° F. 75,000 GHSV$^{-1}$
**50% conversion temperature, 1400 GHSV$^{-1}$
***Aged 24 hours at 1800° F.

Dynamometer Data - Fresh

| | Time to 50% Conv. Seconds | | 600 Sec. Eff. | | Pred. CVS Eff. | |
|---|---|---|---|---|---|---|
| | HC | CO | HC | CO | HC | CO |
| Cat. | 37 | 29 | 98 | 100 | 92 | 83 |
| Std. | 57 | 44 | 93 | 99 | 87 | 81 |

Dynamometer Data - Aged 1000 Hours

| | Time to 50% Conv. Seconds | | 600 Sec. Eff. | | Pred. CVS Eff. | |
|---|---|---|---|---|---|---|
| | HC | CO | HC | CO | HC | CO |
| Cat. | 97 | 72 | 79 | 97 | 78 | 77 |
| Std. | 115 | 87 | 76 | 95 | 74 | 74 |

FIVE CAR FLEET TEST - DETAILS

| | |
|---|---|
| Vehicles: | 5 cars - 350 V-8, 4 BBL. with M-Air |
| MILEAGE ACCUMMULATION: | Rotate converters every 5000 miles, (Every converter will be on each car twice). |
| Programmed chassis dynamometer | 1977 Schedule |

FIVE CAR TEST FLEET 10,000 MILE CATALYST EVALUATIONS
Predicted CVS Data

| HC Conversion Eff. | | CO Conversion Eff. | |
|---|---|---|---|
| Veh. Aged | Dyno. Aged | Veh. Aged | Dyno. Aged |
| Cat. 85 | 87 | 78 | 81 |
| Std. 82 | 83 | 75 | 76 |

TABLE 13

BENCH ACTIVITY DURING AGING ON PULSE FLAME COMBUSTER

| Total Aging Hours | Activity with Propane Feed | | | Activity with Propylene Feed |
|---|---|---|---|---|
| | t50 CO (secs) | t50 HC (secs) | HC Eff. (%) | t50 HC (secs) |
| 0 | 54.3 | 95.4 | 79.9 | 54.0 |
| 69.5 | 66.0 | ND | 57.2 | 69.6 |
| 136.5 | 57.5 | ND | 51.1 | 76.8 |
| 203.5 | 76.8 | — | 38.8 | 96.9 |

Fuel: 0.23 g Pb/gal.; 0.02 g. P/gal.; 0.03% S
Catalyst underwent 152 cycles of 2 hours at 1000° F. and 1 hour at 1300° F.
Temperature is average axial bed temperature

EXAMPLE 12

Eleven 1300 gram batches of spheroidal alumina particles prepared in accordance with the procedure of Example 8 and having the properties shown in Table 14 were impregnated as follows first with palladium, second with platinum.

TABLE 14

| | |
|---|---|
| Average Bulk Density (lbs./ft.³) | 28.8 |
| Crush Strength (lbs.) | 8.7 |
| Average | 12.2 |
| High | 17.0 |
| Low | 9.0 |
| Attrition (%) | 1.1 |
| Sphericity (Major Axis/Minor Axis) | 1.14 |
| Average Diameter (mils) | 135 |
| Surface Area (m²/g) | 113 |
| X-Ray | theta alumina, no alpha alumina |

The palladium solution was prepared by dissolving SO$_2$ at 2m. moles/min. for 10 minutes in 800 ml. deionized water, after which 4.63 ml. Pd (NO$_3$)$_2$ at 105 mg./ml. palladium solution were added. To this 2.00 grams of dibasic ammonium citrate was added, then the solution volume raised to 1277 ml. It was impregnated to incipient wetness, then dried on screens at 320° F. for a minimum of 1½ hours, then dried at 500° F. overnight.

The platinum was then applied from a solution prepared by dissolving 4.077 g. (NH$_4$)$_6$ Pt (SO$_3$)$_4$.xH$_2$O at 30.67% Pt in 800 ml. of water and then raising the impregnation volume to 1277 milliliters. The impregnated support was dried on screens at 320° F., then activated at 800° F. for 1 hour in air.

The bench activity during aging on the pulse flame combustor is shown in Table 15.

TABLE 15

BENCH ACTIVITY DURING AGING ON PULSE FLAME COMBUSTOR

| Total Aging Hours | Activity with Propane Feed | | | | Activity with Propylene Feed |
|---|---|---|---|---|---|
| | t50 CO (secs) | t50 HC (secs) | HC Eff. (%) | CO Eff. (%) | t50 HC (secs) |
| 0 | 45.3 | 92.4 | 81.1 | 99.5 | 42.3 |
| 69.5 | 61.2 | 251.4 | 59.5 | 99.4 | 62.7 |
| 140.0 | 63.6 | 377.4 | 55.2 | 99.3 | 82.5 |

TABLE 15-continued
BENCH ACTIVITY DURING AGING ON PULSE FLAME COMBUSTOR

| Total Aging Hours | Activity with Propane Feed | | | | Activity with Propylene Feed |
| --- | --- | --- | --- | --- | --- |
| | '50 CO (secs) | '50 HC (secs) | HC Eff. (%) | CO Eff. (%) | '50 HC (secs) |
| 210.5 | 66.7 | — | 46.4 | 98.2 | 90.3 |

Fuel: 0.23 g Pb/gal.; 0.02 g. P/gal.; 0.03% S
Catalyst underwent 170 cycles of 2 hours at 1000° F. and 1 hour at 1300° F. Temperature is average axial bed temperature.

The bench and dynamometer test results for this catalyst are shown in Table 16.

TABLE 16

Bench Test Results

| | Fresh | | | | Aged*** | | | |
| --- | --- | --- | --- | --- | --- | --- | --- | --- |
| | HSV* | | Static** | | HSV | | Static | |
| | HC | CO | HC | CO | HC | CO | HC | CO |
| Cat. | 64 | 100 | 230 | 225 | 44 | 100 | 305 | 300 |
| Std. | 41 | 100 | 302 | 303 | 35 | 100 | 351 | 351 |

*Conversion efficiency at 1000° F. 75,000 GHSV$^{-1}$
**50% conversion temperature, 1400 GHSV$^{-1}$
***Aged 24 hours at 1800° F.

Dynamometer Data - Fresh

| | Time to 50% Conv. Seconds | | 600 Sec. Eff. | | Pred. CVS Eff. | |
| --- | --- | --- | --- | --- | --- | --- |
| | HC | CO | HC | CO | HC | CO |
| Cat. | 22 | 17 | 94 | 100 | 91 | 83 |
| Std. | 37 | 30 | 93 | 99 | 89 | 83 |

Dynamometer Data - Aged 1000 Hours

| | Time to 50% Conv. Seconds | | 600 Sec. Eff. | | Pred. CVS Eff. | |
| --- | --- | --- | --- | --- | --- | --- |
| | HC | CO | HC | CO | HC | CO |
| Cat. | 75 | 59 | 79 | 97 | 79 | 78 |
| Std. | 115 | 78 | 73 | 91 | 74 | 73 |

All of the test results (bench and engine) show the catalyst to be excellent in fresh performance and very good in its ability to retain its activity.

EXAMPLE 13

The noble metal penetration in the catalyst of Example 12 was determined by the chloroform attrition method and the results are shown in Table 17.

These results indicate very deep penetration of both the platinum and the palladium. The platinum was higher at the surface to ensure good hydrocarbon performance, whereas the palladium was distributed very uniformly to ensure good light off retention.

TABLE 17

| Cumulative Noble Metal S.A. % | Cumulative Depth Attrited (microns) | Cumulative Platinum (%) | Cumulative Palladium (%) |
| --- | --- | --- | --- |
| 29 | 18 | 14 | 4 |
| 44 | 40 | 28 | 11 |
| 54 | 60 | 39 | 18 |
| 64 | 81 | 51 | 25 |
| 68 | 101 | 59 | 32 |
| 73 | 120 | 65 | 37 |
| 77 | 146 | 72 | 45 |
| 79 | 173 | 77 | 51 |

EXAMPLE 14

A catalyst was prepared by impregnating spheroidal alumina particles that were prepared in accordance with the procedure of Example 8 and that had the properties shown in Table 18.

TABLE 18

| Bulk Density (lbs./ft.$^3$) | 27.1 |
| --- | --- |
| Crush Strength (lbs.) | 11.4 |
| Sphericity (Major Axis/Minor Axis) | 1.32 |
| Surface Area (m.$^2$/g.) | 112 |
| X-Ray | theta alumina, no alpha alumina present |

100 cc. (43.7 g.) of the particles were impregnated to incipient wetness with a solution prepared by dissolving 59 mg. of $(NH_4)_6$ Pd $(SO_3)_4 \cdot xH_2O$ (containing 17.84% palladium) and 90 mg. of $(NH_4)_6$ Pt $(SO_3)_4 \cdot xH_2O$ (containing 29.28% platinum) in 42 ml. water. After impregnation, the catalyst was dried on a screen at 320° F. in a forced draft oven. It was then activated at 800° F. in air for one hour. This catalyst exhibited outstanding fresh and pulsator aged performance. In particular, it had good light off, for example, as shown by very stable '50 CO values.

TABLE 19

Bench Activity During Aging on Pulse Flame Combustor

| Total Aging Hours | Activity with Propane Feed | | | Activity with Propylene Feed |
| --- | --- | --- | --- | --- |
| | '50 CO (secs) | '50 HC (secs) | HC Eff. (%) | '50 HC (secs) |
| 0 | 46.2 | 66.0 | 89.5 | 45.9 |
| 70 | 58.5 | 160.8 | 69.0 | 57.9 |
| 137.5 | 62.1 | 185.7 | 64.7 | 74.4 |
| 206.5 | 57.6 | 337.5 | 56.1 | 63.6 |

Fuel: 0.23 g. Pb/gal.; 0.02 g. P/gal.; 0.03% S
Catalyst underwent 160 cycles of 2 hours at 1000° F. and 1 hour at 1300° F. Temperature is average axial bed temperature.

EXAMPLE 15

A catalyst was prepared by impregnating spheroidal alumina particles that were prepared in accordance with the procedure of Example 8 and that had the properties shown in Table 20.

TABLE 20

| Bulk Density (lbs./ft.$^3$) | 29.7 |
| --- | --- |
| Crush Strength (lbs.) | 9.2 |
| Sphericity (Major Axis/Minor Axis) | 1.16 |
| Attrition loss (%) | 0.25% |
| Surface Area (m.$^2$/g.) | 105 |
| X-Ray | theta alumina, no alpha alumina present |

100 cc. (49.02 grams) of the particles were impregnated to incipient wetness with a solution prepared by bubbling $SO_2$ at 1 m. mole/min. for 20 seconds into 10 milliliters of water, to which was added 0.100 ml. of $Pd(NO_3)_2$ at 105 mg. Pd per ml. To this solution was then added 0.682 ml. of acid platinum sulfito complex prepared by cation exchanging of $(NH_4)_6$ Pt $(SO_3)_4 \cdot xH_2O$ which contained 38.6 mg. Pt/ml. Total impregnation volume was increased to 42 ml. After impregnation the sample was placed on a screen and forced draft oven dried at 320° F. The sample was activated at 800° F. in air for 1 hour.

The catalyst contains 0.05 oz./ft.$^3$ total noble metals at 5/2 Pt/Pd ratio. The penetration depth was 25 to 50 microns.

The bench activity data for this catalyst are shown in Table 21. The catalyst performance is good but not nearly as is observed on catalysts with deeper penetrations.

TABLE 21
BENCH ACTIVITY DURING AGING ON PULSE FLAME COMBUSTOR

| Total Aging Hours | Activity with Propane Feed | | | | Activity with Propylene Feed | | |
|---|---|---|---|---|---|---|---|
| | $t_{50}$ CO (secs) | $t_{50}$ HC (secs) | HC Eff. (%) | CO Eff. (%) | $t_{50}$ HC (secs) | HC Eff. (%) | CO Eff. (%) |
| 0 | 52.0 | 72.9 | 90.6 | 99.5 | 52.5 | 99.5 | 99.7 |
| 70 | 90.6 | — | 30.9 | 99.3 | 121.2 | 97.2 | 99.2 |
| 146 | 99.5 | — | 25.2 | 98.9 | 116.1 | 97.2 | 99.2 |

Test terminated due to rapid loss in propane efficiency
Fuel: 0.23 g. Pb/gal.; 0.02 g. P/gal.; 0.03% S
Catalyst underwent 49 cycles of 2 hours at 1000° F. and 1 hour at 1300° F.
Temperature is average axial bed temperature

EXAMPLE 16

A three way catalyst was prepared on the support described in Table 22

TABLE 22

| Average Bulk Density (lbs./ft.$^3$) | 29.8 |
|---|---|
| Crush Strength (lbs.) | 9.3 |
| Attrition % | 0.14 |
| Sphericity (Major Axis/Minor Axis) | 1.23 |
| X-Ray | theta alumina, no alpha alumina present |

Two batches of 1300 g. (=2.724 liters) of support was impregnated as follows:

The support was sprayed to ½ of incipient wetness using an atomizing nozzle with a solution prepared by bubbling SO$_2$ into 400 milliliters of water for 6.12 minutes at 2 m moles SO$_2$/min. To this 2.757 milliliters of Pd(NO$_3$)$_2$ solution at 105 mg. Pd/ml. were added. Then 1.284 g. ammonium citrate (dibasic) was added and volume increased to 610 milliliters total. Immediately after palladium application, a solution prepared by dissolving 2.2005 g. (NH$_4$)$_6$ Pt (SO$_3$)$_4$×H$_2$O at 32.88% platinum in 400 milliliters of water and then diluting to 610 milliliters was sprayed to the remainder of incipient wetness. It was dried at 320° F. for 2 hours and then at 500° F. for 1 hour. It was then sprayed to 95% of incipient wetness with a solution prepared by diluting acid rhodium sulfite solution which was prepared by cation exchanging (NH$_4$)$_6$ Rh (SO$_3$)$_4$×H$_2$O using a cation exchange resin. 4.24 milliliters of acid rhodium sulfite at 50.65 mg. rhodium per ml. were diluted to 1160 milliliters and then sprayed on the support. The impregnated catalyst was dried at 320° F. and was then activated at 600° F. for 1 hour.

Resultant total noble metal loading was 0.332 oz. total noble metal per cubic foot of catalyst.

In Table 23, the results of three way catalyst testing are described. Considering the very small amount of rhodium present, the conversion of nitrogen oxides to nitrogen was quite high which is attributed to the proper positioning of the rhodium in the spheroidal particles.

TABLE 23
NO$_x$ Conversion Efficiencies at Approx. 40,000 GHSV

| Bed Temperature | $\phi = 0.70$ | | | $\phi = 0.95$ | | |
|---|---|---|---|---|---|---|
| | 750° F. | 900° F. | 1050° F. | 750° F. | 900° F. | 1050° F. |
| Fresh NO$_x$→N$_2$ | 64.8 | 75.0 | 87.5 | 97.7 | 97.7 | 97.7 |
| NO$_x$ (total) | 98.9 | 98.9 | 100 | 98.9 | 98.9 | 98.9 |

FEED:
1% CO, 250 ppm. HC(C$_3$H$_6$/C$_3$H$_8$ = 3/1), 0.34% H$_2$, 1,000 ppm. NO, 12% CO$_2$, 13% H$_2$O, varying concentrations of O$_2$, balance N$_2$.
$\phi$ is a measure of air/fuel ratio defined as $\phi = \dfrac{\text{Actual concentration of O}_2 \text{ in the feed}}{\text{O}_2 \text{ concentration required for stoichiometry}}$

EXAMPLE 17

A catalyst was prepared on the spheroidal alumina particles of Table 18 by impregnating platinum and palladium on different particles.

Two components were prepared; platinum on alumina, and palladium on alumina. They were prepared to provide a blend of 42.31% by weight Pd component and 57.69% by weight Pt component that gave an equal atom loading on each support. The total noble metal loading is 0.332 oz. per cubic foot.

The palladium particles were prepared by incipient wetness impregnation of 100 cc. (43.7 g.) of the support with a solution of (NH$_4$)$_6$ Pd (SO$_3$)$_4$×H$_2$O at 17.84% palladium dissolved in sufficient water to give a total volume of 42 milliliters. The impregnated support was dried at 320° F. and activated for 1 hour at 800° F.

The platinum particles were prepared by incipient wetness impregnation of 100 cc. (43.7 g.) of the support with a solution of (NH$_4$)$_6$ Pt (SO$_3$)$_4$×H$_2$O at 29.28% platinum dissolved in sufficient water to give a total volume of 42 milliliters. The impregnated support was dried at 320° F. and activated for 1 hour at 800° F.

The fresh activity and activity after 24 hours at 1800° F. is shown in Table 24 and the pulsator aging in Table 25. The fresh and thermal aged activites were excellent. Pulsator aged performance was quite good.

TABLE 24

| | Fresh |
|---|---|
| $t_{50}$ CO (seconds) | 44 |
| HC efficiency (%) | 90 |

| | 24 hours at 1800° F. |
|---|---|
| $t_{50}$ CO (seconds) | 61 |
| HC Efficiency (%) | 70 |

TABLE 25
BENCH ACTIVITY DURING AGING ON PULSE FLAME COMBUSTOR

| Total Aging Hours | Activity with Propane Feed | | | | Activity with Propylene Feed | | |
|---|---|---|---|---|---|---|---|
| | $t_{50}$ CO (secs) | $t_{50}$ HC (secs) | HC Eff. (%) | Co Eff. (%) | $t_{50}$ HC (secs) | HC Eff. (%) | Co Eff. (%) |
| 0 | 44.4 | 63.0 | 90.3 | 99.2 | 38.1 | 99.2 | 99.2 |
| 69 | 56.2 | 138.0 | 72.6 | 99.3 | 58.5 | 98.9 | 99.2 |
| 138.5 | 60.0 | 184.8 | 61.4 | 99.3 | 57.0 | 98.7 | 99.4 |
| 209.0 | 63.7 | 531.3 | 52.6 | 99.3 | 69.9 | 98.0 | 99.3 |

Fuel: 0.23 g. Pb/gal.; 0.02 g. P/gal.; 0.03% S
Catalyst Underwent 70 cycles of 2 hours at 1000° F. and 1 hour at 1300° F.
Temperature is average axial bed temperature

EXAMPLE 18

The spheroids discussed in Example 8 were measured for nitrogen pore size and surface area distributions. The technique used is described by E. V. Ballou and O. K. Doolen in their article, Automatic Apparatus for Determination of Nitrogen Adsorption and Desorption Isotherms, published in *Analytical Chemistry*, Volume 32, pp. 532-536 (April, 1960). The equipment used for this determination was an Aminco Adsorptomat manufactured by American Instrument Company of Silver Spring, Maryland.

The nitrogen BET surface area of this material was 120 m$^2$/g with the following distribution:

| Pore Diameter (Å) | Approximate % of Cumulative Nitrogen Surface Area to Indicated Diameter |
|---|---|
| 600 | 1.3% |
| 500 | 1.6% |
| 400 | 2.3% |
| 300 | 5.0% |
| 200 | 16.3% |
| 150 | 46.4% |
| 100 | about 100% |

It is obvious from these data that the vast majority of the pores were in the intermediate range of 100-1000 Å. More specifically, over 80% of the pores were between 100 and 200 Å, and that no surface area was detected by this technique below pores of 100 Å in diameter.

What is claimed is:

1. A catalyst support comprising spheroidal alumina particles having a total pore volume of about 0.8 to about 1.7 cubic centimeters per gram, a pore volume of about 0.5 to about 1.0 cubic centimeters per gram in pores of 100 to 1000 Å. in diameter, a pore volume of about 0.1 to about 0.4 cubic centimeters per gram in pores of 1000 to 10,000 Å. in diameter, a surface area of about 80 to about 135 square meters per gram, an attrition loss of less than about 5%, a crush strength of at least about 5 pounds, a volume shrinkage of less than about 6% upon exposure to a temperature of 1800° F. for 24 hours, and a compacted bulk density of about 20 to about 36 pounds per cubic foot.

2. The support of claim 1 also having a pore volume of 0 to about 0.06 cubic centimeters per gram in pores of less than 100 Å. in diameter.

3. The support of claim 1 having a pore volume of about 0.2 to about 0.3 cubic centimeters per gram in pores of from 1000 to 10,000 Å. in diameter, a pore volume of about 0.6 to about 0.9 centimeters per gram in pores of from 100 to 1000 Å. in diameter, a pore volume of 0 to about 0.04 cubic centimeters per gram in pores of less than 100 Å. in diameter, and a total pore volume of about 0.9 to about 1.2 cubic centimeters per gram.

4. The support of claim 3 having a surface area of about 90 to about 120 square meters per gram, an attrition loss of less than about 2%, a volume shrinkage of less than about 4% upon exposure to a temperature of 1800° F. for 24 hours, a compacted bulk density of about 26 to about 32 pounds per cubic foot, and a crush strength of greater than about 7 pounds.

5. A catalyst comprising the support of claim 1 having deposited thereon a catalytically effective amount of at least one catalytically active metal or metal oxide.

6. The catalyst of claim 5 in which the catalytically active metal is a platinum group metal selected from the group consisting of platinum, palladium, ruthenium, iridium, rhodium, osmium and mixtures thereof.

7. The catalyst of claim 6 in which the platinum group metal is in an amount up to about 1.0% by weight of the catalyst.

8. The catalyst of claim 6 in which the platinum group metal comprises platinum and palladium.

9. The catalyst of claim 8 in which the platinum and the palladium are deposited on separate spheroidal alumina particles.

10. The catalyst of claim 8 in which the metals are deposited such that about 50% of the total metal surface area is located at depths greater than about 50 microns from the external boundary of the support.

11. The catalyst of claim 8 in which the metals are deposited such that about 50 weight percent of the total metals is located at depths greater than about 75 microns from the external boundary of the support.

12. The catalyst of claim 6 in which the catalytically active metal comprises platinum, palladium, and rhodium.

13. The catalyst of claim 12 in which the metals are deposited such that about 50% of the total metal surface area is located at depths greater than about 50 microns from the external boundary of the support.

14. The catalyst of claim 12 in which the metals are deposited such that about 50 weight percent of the total metals is located at depths greater than about 75 microns from the external boundary of the support.

15. A catalyst comprising the support of claim 5 having deposited thereon catalytically effective amounts of platinum and palladium such that about 50% of the total metal surface area is located at depths greater than about 50 microns from the external surface of support.

16. The catalyst of claim 6 in which the maximum depth of metal penetration is about 150-400 microns.

17. The catalyst of claim 16 in which the maximum depth of metal penetration is about 150-250 microns.

18. The catalyst of claim 12 in which the maximum depth of penetration of the platinum is about 125-400 microns, the maximum depth of penetration of the palladium is about 125-400 microns, and the maximum depth of penetration of the rhodium is about 125-250 microns.

19. The catalyst of claim 18 in which the maximum depth of penetration of the platinum is about 125-250 microns, the maximum depth of penetration of the palladium is about 125-250 microns, and the maximum depth of penetration of the rhodium is about 125-200 microns.

20. The support of claim 1 comprising spheroidal alumina particles calcined at about 1750° to about 1950° F. for a period of from about 30 minutes to about 3 hours.

21. The support of claim 20 in which the particles are calcined for a period of from about 1 hour to about 2 hours.

22. The support of claim 1 comprising spheroidal alumina particles calcined at about 1800° to about 1900° F. for a period of from about 30 minutes to about 3 hours.

23. The support of claim 22 in which the particles are calcined for a period of from about 1 to about 2 hours.

* * * * *